(12) United States Patent
Picon Ruiz et al.

(10) Patent No.: US 12,148,197 B2
(45) Date of Patent: Nov. 19, 2024

(54) SYSTEM AND METHOD FOR PLANT DISEASE DETECTION SUPPORT

(71) Applicant: BASF SE, Ludwigshafen am Rein (DE)

(72) Inventors: Artzai Picon Ruiz, Derio (ES); Matthias Nachtmann, Limburgerhof (DE); Maximilian Seitz, Limburgerhof (DE); Patrick Mohnke, Limburgerhof (DE); Ramon Navarra-Mestre, Limburgerhof (DE); Alexander Johannes, Limburgerhof (DE); Till Eggers, Ludwigshafen (DE); Amaia Maria Ortiz Barredo, Vitoria-Gasteiz (ES); Aitor Alvarez-Gila, Derio (ES); Jone Echazarra Huguet, Derio (ES)

(73) Assignee: BASF SE, Ludwigshafen am Rhein (DE)

( * ) Notice: Subject to any disclaimer, the term of this patent is extended or adjusted under 35 U.S.C. 154(b) by 329 days.

(21) Appl. No.: 17/611,517

(22) PCT Filed: May 14, 2020

(86) PCT No.: PCT/EP2020/063428
§ 371 (c)(1),
(2) Date: Nov. 15, 2021

(87) PCT Pub. No.: WO2020/229585
PCT Pub. Date: Nov. 19, 2020

(65) Prior Publication Data
US 2022/0230305 A1      Jul. 21, 2022

(30) Foreign Application Priority Data
May 16, 2019    (EP) ..................... 19174907

(51) Int. Cl.
*G06V 10/764* (2022.01)
*G06N 3/048* (2023.01)
(Continued)

(52) U.S. Cl.
CPC .......... *G06V 10/764* (2022.01); *G06N 3/048* (2023.01); *G06T 7/0012* (2013.01); *G06T 7/10* (2017.01);
(Continued)

(58) Field of Classification Search
None
See application file for complete search history.

(56) References Cited

U.S. PATENT DOCUMENTS

| 10,685,231 | B2 | 6/2020 | Sugaya |
| 2013/0136312 | A1 | 5/2013 | Tseng et al. |

FOREIGN PATENT DOCUMENTS

WO    2018/221625 A1    12/2018

OTHER PUBLICATIONS

Barbedo, J. G. "Impact of dataset size and variety on the effectiveness of deep learning and transfer learning for plant disease classification." Computers and Electronics in Agriculture, vol. 153, Oct. 2018, pp. 46-53, doi:10.1016/j.compag.2018.08.013 (Year: 2018).*

(Continued)

*Primary Examiner* — Vu Le
*Assistant Examiner* — Charles C L Penny
(74) *Attorney, Agent, or Firm* — ArentFox Schiff LLP

(57) ABSTRACT

A computer-implemented method, computer program product and computer system (100) for detecting plant diseases. The system stores a convolutional neural network (120) trained with a multi-crop dataset. The convolutional neural network (120) has an extended topology comprising an image branch (121) based on a classification convolutional neural network for classifying the input images according to (Continued)

plant disease specific features, a crop identification branch (122) for adding plant species information, and a branch integrator for integrating the plant species information with each input image. The plant species information (20) specifies the crop on the respective input image (10). The system receives a test input comprising an image (10) of a particular crop (1) showing one or more particular plant disease symptoms, and further receives a respective crop identifier (20) associated with the test input via an interface (110). A classifier module (130) of the system applies the trained convolutional network (120) to the received test input, and provides a classification result (CR1) according to the output vector of the convolutional neural network (120). The classification result (CR1) indicates the one or more plant diseases associated with the one or more particular plant disease symptoms.

15 Claims, 9 Drawing Sheets

(51) Int. Cl.
    *G06T 7/00*           (2017.01)
    *G06T 7/10*           (2017.01)
    *G06V 10/82*         (2022.01)
    *G06V 20/10*         (2022.01)

(52) U.S. Cl.
    CPC ............ *G06V 10/82* (2022.01); *G06V 20/188* (2022.01); *G06T 2207/20081* (2013.01); *G06T 2207/20084* (2013.01); *G06T 2207/30188* (2013.01)

(56) References Cited

OTHER PUBLICATIONS

Mohanty, S.P. et al. "Using Deep Learning for Image-Based Plant Disease Detection." Frontiers in plant science vol. 7 1419. Sep. 22, 2016, doi:10.3389/fpls.2016.01419 (Year: 2016).*
S. Bargoti and J. P. Underwood, "Image segmentation for fruit detection and yield estimation in apple orchards," Journal of Field Robotics, vol. 34, No. 6, pp. 1039-1060, Feb. 2017. doi:10.1002/rob.21699 (Year: 2017).*
A. Picon et al., "Crop conditional convolutional neural networks for massive multi-crop plant disease classification over cell phone acquired images taken on real field conditions," Computers and Electronics in Agriculture, vol. 167, p. 105093, Dec. 2019. doi:10.1016/j.compag.2019.105093 (Year: 2019).*
M. Mehdi, & S. Osindero, "Conditional generative adversarial nets." arXiv preprint 2014 arXiv:1411.1784 (Year: 2014).*
Lu, et al., "An in-field automatic wheat disease diagnosis system", Computers and Electronics in Agriculture, vol. 142, Nov. 2017, pp. 369-379.
Picon, et al., "Deep convolutional neural networks for mobile capture device-based crop disease classification in the wild", Computers and Electronics in Agriculture, vol. 161, Jun. 2019, pp. 280-290.
Ferentinos, "Deep learning models for plant disease detection and diagnosis", Computers and Electronics in Agriculture, vol. 145, Feb. 2018, pp. 311-318.
Sladojevic et al., "Deep neural networks based recognition of plant diseases by leaf image classification", Computational Intelligence and Neuroscience, vol. 2016, article ID 3289801, 11 pages.
Hughes, D., "An open access repository of images on plant health to enable the development of mobile disease diagnostics", arXivpreprint arXiv:1511.08060, 2015, 13 pages.
Mohanty et al, "Using deep learning for image based plant disease detection," Frontiers in Plant Science 7, 2016, 10 pages.
Brahimi et al., "Deep learning for plant diseases: Detection and saliency map visualisation", Human and Machine Learning, Chapter 6, Springer, 2018 pp. 93-117.
Tan et al., "Deep learning for plant species classification using leaf vein morphometric", IEEE/ACM Transactions on Computational Biology and Bioinformatics, vol. 17, No. 1, 2018, pp. 82-90.
Alfarisy et al., "Deep learning based classification for paddy pests & diseases recognition", Proceedings of 2018 International Conference on Mathematics and Artificial Intelligence, Apr. 2018, pp. 21-25.
Cruz et al., "Vision-based grapevine pierces disease detection system using artificial intelligence", 2018 ASABE Annual International Meeting, American Society of Agricultural and Biological Engineers, 8 pages.
Amara, J., Bouaziz, B., Algergawy, A., et al., "A deep learning-based approach for banana leaf diseases classification", Lecture Notes in Informatics (LNI), Gesellschaft für Informatik, Bonn 2017, pp. 79-88.
Barbedo, "A review on the main challenges in automatic plant disease identification based on visible range images", Biosystems Engineering 144, 2016, pp. 52-60.
Johannes et al., "Automatic plant disease diagnosis using mobile capture devices, applied on a wheat use case", Computers and Electronics in Agriculture 138, 2017, pp. 200-209.
Jégou et al., "The One Hundred Layers Tiramisu: Fully Convolutional DenseNets for Semantic Segmentation", Proceedings of the IEEE Conference on Computer Vision and Pattern Recognition (CVPR) Workshops, 2017, pp. 11-19.
He et al., "Deep residual learning for image recognition", Proceedings of the IEEE Conference on Computer Vision and Pattern Recognition, 2016, pp. 770-778.
Russakovsky et al., "ImageNet Large Scale Visual Recognition Challenge", International Journal of Computer Vision 115, 2015, pp. 211-252.
Parikh et al. "Understanding and using sensitivity, specificity and predictive values", Indian Journal of Opthamology 56 (1), 2008, pp. 45-50.
International Search Report and Written Opinion for PCT Patent Application No. PCT/EP2020/063428, mailed Aug. 10, 2020, 8 pgs.
Picon et al., "Crop conditional Convolutional Neural Networks for massive multi-crop plant disease classification over cell phone acquired images taken on real filed conditions", Computers and Electronics in Agriculture, vol. 167, 2019, pp. 1-10.
"Multiple Inputs for CNN: images and parameters, how to merge", https://stackoverflow.com/questions/51341613/multiple-inputs-for-cnn-images-and-parameters-how-to-merge; screen shot with publication date Jul. 14, 2018, 2 pgs.
Boutell et al., "Bayesian Fusion of Camera Metadata Cues in Semantic Scene Classification", Proceedings of the 2004 IEEE Computer Society Conference on Computer Vision and Pattern Recognition, 2004, 8 pgs.
Boutell et al., "Beyond Pixels: Exploiting Camera Metadata for Photo Classification", Pattern Recognition, Jun. 2005, vol. 38, Issue 6, pp. 935-946.
Chen et al., "City-Scale Landmark Identification on Mobile Devices", CVPR 2011, IEEE, 2011, pp. 737-744.
Picon et al., "A statistical recommendation model of mobile services based on contextual evidences", Expert Systems with Applications, Jan. 2012, vol. 39, Issue 1, pp. 647-653.
Mirza et al., "Conditional generative adversarial nets", arXiv preprint, arXiv: 1411.1784, 2014, 7 pgs.
Venette et al., "Pest Risk Maps for Invasive Alien Species: A Roadmap for Improvement", BioScience, vol. 60, No. 5, 2010, pp. 349-362.
Magarey et al., "NAPPFAST: An Internet System of the Weather-Based Mapping of Plant Pathogens", Plant Disease, vol. 91, No. 4, 2007, pp. 336-345.

* cited by examiner

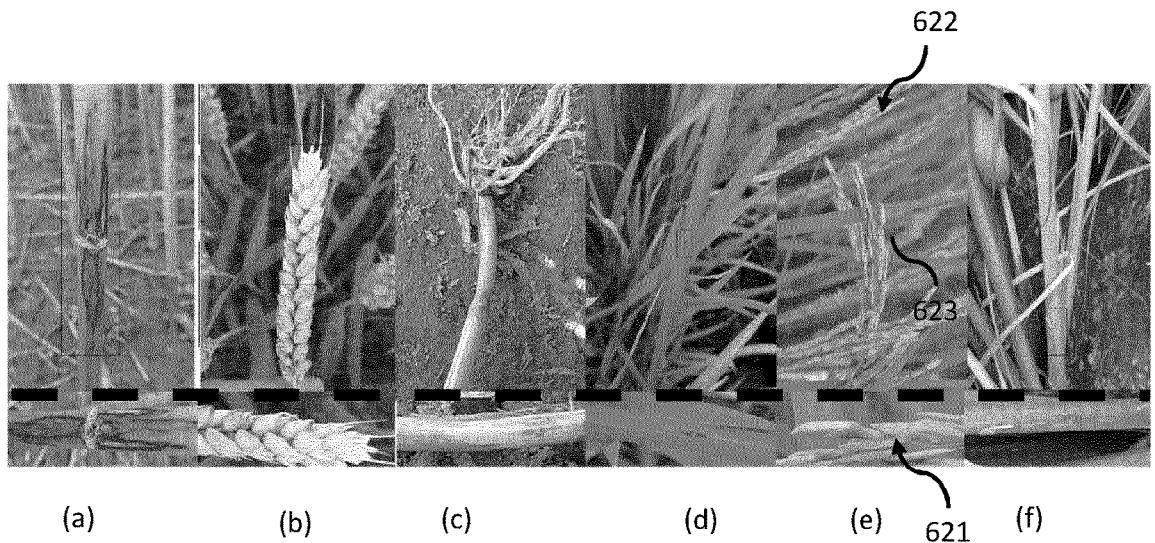

FIG. 6C

Table 1: Generated database for training and validation

| Crop | EPPO-CODE | Disease Name | Disease EPPO-code | Total |
|---|---|---|---|---|
| Winter wheat | TRZAW | Abiotic | HEALTHY | 4854 |
| Winter wheat | TRZAW | Septoria tritici | SEPTTR | 16392 |
| Winter wheat | TRZAW | Puccinia striiformis | PUCCST | 15375 |
| Winter wheat | TRZAW | Puccinia recondita | PUCCRT | 15411 |
| Winter wheat | TRZAW | Septoria nodorum | LEPTNO | 601 |
| Winter wheat | TRZAW | Drechslera tritici-repentis | PYRNTR | 7613 |
| | | | Total wheat: | 56659 |
| Corn | ZEAMX | Abiotic | HEALTHY: | 206 |
| Corn | ZEAMX | Helminthosporium turcicum | SETOTU | 425 |
| | | | Total corn: | 631 |
| Rape seed | BRSNW | Abiotic | HEALTHY | 4291 |
| Rape seed | BRSNW | Phoma lingam | LEPTMA | 6924 |
| | | | Total rape seed: | 11215 |
| Winter barley | HORVW | Abiotic | HEALTHY: | 1643 |
| Winter barley | HORVW | Pyrenophora teres | PYRNTE | 14067 |
| Winter barley | HORVW | Ramularia collo-cygni | RAMUCC | 3441 |
| Winter barley | HORVW | Rhynchosporium secalis | RHYNSE | 11263 |
| Winter barley | HORVW | Puccinia hordei | PUCCHD | 2993 |
| | | | Total winter barley: | 32229 |
| | | | Total: | 100734 |

FIG. 7A

Table 2: Validation results for baseline topology ResNet50 with crops trained together

| Network Topology | ResNet50 | Training dataset | ALL-CROPS | | | |
|---|---|---|---|---|---|---|
| Disease | AuC | BAC | Sens | Spec | NPV | PPV |
| SEPTTR | 0.99 | 0.95 | 0.91 | 0.99 | 0.98 | 0.92 |
| PUCCST | 1.00 | 0.98 | 0.94 | 0.99 | 0.99 | 0.96 |
| PUCCRT | 0.99 | 0.92 | 0.86 | 0.98 | 0.98 | 0.90 |
| LEPTNO | 0.99 | 0.78 | 0.56 | 1.00 | 1.00 | 0.64 |
| PYRNTR | 1.00 | 0.97 | 0.94 | 1.00 | 1.00 | 0.94 |
| SETOTU | 1.00 | 0.95 | 0.91 | 0.99 | 0.92 | 0.92 |
| LEPTMA | 1.00 | 1.00 | 0.99 | 1.00 | 1.00 | 1.00 |
| PYRNTE | 1.00 | 0.96 | 0.93 | 0.99 | 0.99 | 0.96 |
| RAMUCC | 1.00 | 0.99 | 0.98 | 1.00 | 1.00 | 0.97 |
| RHYNSE | 0.99 | 0.96 | 0.93 | 1.00 | 0.99 | 0.97 |
| PUCCHD | 1.00 | 0.94 | 0.88 | 1.00 | 1.00 | 0.90 |

FIG. 7B

Table 3: Validation results for baseline topology ResNet50 with crops trained separately

| Network Topology | ResNet50 | Training dataset | SEPARATED-CROPS | | | |
|---|---|---|---|---|---|---|
| Disease | AuC | BAC | Sens | Spec | NPV | PPV |
| SEPTTR | 0.94 | 0.86 | 0.81 | 0.91 | 0.92 | 0.79 |
| PUCCST | 0.97 | 0.90 | 0.95 | 0.92 | 0.94 | 0.86 |
| PUCCRT | 0.94 | 0.86 | 0.78 | 0.94 | 0.92 | 0.82 |
| LEPTNO | 0.96 | 0.77 | 0.54 | 0.99 | 1.00 | 0.45 |
| PYRNTR | 0.98 | 0.91 | 0.83 | 0.99 | 0.98 | 0.91 |
| SETOTU | 0.44 | 0.52 | 1.00 | 0.05 | 1.00 | 0.70 |
| LEPTMA | 0.98 | 0.93 | 0.96 | 0.90 | 0.93 | 0.94 |
| PYRNTE | 0.95 | 0.88 | 0.87 | 0.90 | 0.90 | 0.87 |
| RAMUCC | 0.99 | 0.94 | 0.89 | 0.99 | 1.00 | 0.90 |
| RHYNSE | 0.96 | 0.90 | 0.87 | 0.93 | 0.94 | 0.87 |
| PUCCHD | 0.99 | 0.91 | 0.83 | 0.99 | 0.98 | 0.93 |

FIG. 7C

Table 4: Validation results with RESNET-MC-1 architecture

| Network Topology | RESNET-MC-1 | Training dataset | ALL-CROPS | | | |
|---|---|---|---|---|---|---|
| Disease | AuC | BAC | Sens | Spec | NPV | PPV |
| SEPTTR | 1.00 | 0.97 | 0.95 | 0.99 | 0.99 | 0.96 |
| PUCCST | 1.00 | 0.98 | 0.97 | 1.00 | 0.99 | 0.97 |
| PUCCRT | 0.99 | 0.95 | 0.92 | 0.98 | 0.99 | 0.90 |
| LEPTNO | 0.97 | 0.84 | 0.67 | 1.00 | 1.00 | 0.70 |
| PYRNTR | 1.00 | 0.99 | 0.95 | 1.00 | 1.00 | 0.98 |
| SETOTU | 1.00 | 0.98 | 0.95 | 1.00 | 0.91 | 1.00 |
| LEPTMA | 1.00 | 1.00 | 1.00 | 1.00 | 1.00 | 1.00 |
| PYRNTE | 1.00 | 0.97 | 0.94 | 1.00 | 0.99 | 0.97 |
| RAMUCC | 1.00 | 0.99 | 0.98 | 1.00 | 1.00 | 0.99 |
| RHYNSE | 0.99 | 0.98 | 0.96 | 1.00 | 0.98 | 1.00 |
| PUCCHD | 0.99 | 0.96 | 0.91 | 1.00 | 1.00 | 0.95 |

FIG. 7D

SYSTEM AND METHOD FOR PLANT DISEASE DETECTION SUPPORT

CROSS-REFERENCE TO RELATED APPLICATION(S)

This application is a national stage entry under 35 U.S.C. § 371 of International Application No. PCT/EP2020/063428, filed on May 14, 2020, which claims the benefit of priority of European Patent Application No. 19174907.6, filed on May 16, 2019, the disclosures of which are hereby incorporated by reference herein in their entireties.

TECHNICAL FIELD

The present invention generally relates to electronic data processing, and more particularly, relates to image processing methods, computer program products and systems to support plant disease detection.

BACKGROUND

Over the past years, extensive research has been done on RGB image-based plant disease classification methods. Since the late 90s, classical computer vision approaches have been widely used to address automated plant identification. A main handicap of classical computer vision methodologies that has been discussed by many authors is that they present a limited expressive power. This keeps them away from further generalizing and to take advantage of a larger number of training pictures. Further, they are not able to distinguish among diseases with subtle perceptual differences. Because of this, real field deployment of classical algorithms has always been difficult and image illumination normalization techniques were required to circumvent these limitations.

The advent of Deep Convolutional Neural Networks (CNNs) has provided a flexible framework that allows for the definition of models that act both as descriptive hierarchical feature extractor and as classifier. CNN architectures can be extended and adapted in complexity to match the expressive power required by any given task and data availability, including image-based plant disease identification tasks for plants in an agricultural field. The work carried out by Sladojevic et al. (Deep neural networks based recognition of plant diseases by leaf image classification; Computational Intelligence and Neuroscience 2016) applied an AlexNet-like architecture to model 13 different diseases from an image dataset obtained through internet online search. A huge effort was made on the generation of publicly available datasets with the PlantVillage initiative (Hughes, D., Salathe, M., et al., 2015. An open access repository of images on plant health to enable the development of mobile disease diagnostics. arXivpreprint arXiv:1511.08060). Their generated dataset contains more than 50,000 expertly curated images of healthy and infected leaves of 14 different crops (apple, blueberry, corn, grape, etc.) and a total number of 26 different diseases allowing their promoters to develop a disease identification classifier (Mohanty, S. P., Hughes, D. P., Salathe, M., 2016. Using deep learning for image based plant disease detection. Frontiers in Plant Science 7).

Authors reported an accuracy of 99.35% on their model on a held-out test set. However, when the algorithm was tested under conditions different to the ones of the training database, the accuracy decreased to as low as 31.4%.

The fact that only one type of disease is present at each image and that the images are taken under controlled conditions constitute the two main limitations that preclude its use as a real digital farming application where early disease detection on uncontrolled illumination conditions is essential for a correct deployment. Several studies have been conducted over this dataset: For example, Brahimi et al. (2018. Deep learning for plant diseases: Detection and saliency map visualisation, in: Human and Machine Learning. Springer, pp. 93-117) analyzed the correspondence between the image saliency map and network activations to understand the behavior of the network obtaining state of art results, whereas Tan et al. (2018. Deep learning for plant species classification using leaf vein morphometric. IEEE/ACM transactions on computational biology and bioinformatics) restricted the PlantVillage dataset for a tomato-specific and detailed analysis. Deep learning networks have been also recently adapted to other crops such as rice (Alfarisy et al., 2018. Deep learning based classification for paddy pests & diseases recognition, in: Proceedings of 2018 International Conference on Mathematics and Artificial Intelligence, ACM. pp. 21-25), grapevine (Cruz, A. C., El-Kereamy, A., Ampatzidis, Y., 2018. Vision-based grapevine pierces disease detection system using artificial intelligence, in: 2018 ASABE Annual International Meeting, American Society of Agricultural and Biological Engineers. p. 1), wheat (Picon et al., 2018. Deep convolutional neural networks for mobile capture device-based crop disease classification in the wild. Computers and Electronics in Agriculture) or banana (Amara, J., Bouaziz, B., Algergawy, A., et al., 2017. A deep learning-based approach for banana leaf diseases classification, in: BTW (Workshops), pp. 79-88) and some recent work from Ferentinos, K. P. (2018. Deep learning models for plant disease detection and diagnosis. Computers and Electronics in Agriculture 145, 311-318) used a dataset of more than 80000 images to successfully distinguish among 58 distinct classes from 25 different crops with more than a 99% accuracy over the testing dataset by the use of five well-known CNN architectures.

Beside current advances, the disease classification problem is far from being solved. The extensive work from Barbedo (J. G. A., 2016. A review on the main challenges in automatic plant disease identification based on visible range images. Biosystems engineering 144, 52-60) analyzes its current challenges in deep detail. These challenges comprise:

The presence of multiple simultaneous disorders on a plant.
The existence of different disorders that present similar visual symptoms.
The high variability of symptoms for a specific disorder.
The complexity on the dataset acquisition, annotation and quality.

The previously cited approaches do not fully cover these challenges as they are focused on medium-late symptoms, do not cope with disorders with similar symptoms, do not support simultaneous diseases detection on the same plant and do not take into account available crop related information beyond the mere images. Also, recent publications by Lu, J. et al. (2017. An in-field automatic wheat disease diagnosis system. Computers and Electronics in Agriculture 142, 369-379) or Picon et al. (2018. Deep convolutional neural networks for mobile capture device-based crop disease classification in the wild. Computers and Electronics in Agriculture) do not solve the above problems. Lu et al. propose a MIL (Multiple Instance Learning) based approach over a fully convolutional network to integrate the neural network receptive field to focus on early disease activation map. Picon et al. propose a region-based method to focus on early diseases while allowing the detection of multiple diseases on the same plant.

SUMMARY

There is therefore a need to provide systems and methods with improved image analysis functions for plant disease detection allowing to obtain richer and more robust shared visual features than those obtained from independent single crop counterpart models in the prior art, and that do not suffer from the presence of different disorders with similar symptoms from the different crops, and that can further take into account contextual meta-data associated with the crop but not included in the crop image, to perform crop-conditional disease classification.

The term "plant disease" as used in the context of the present application is any deviation from the normal physiological functioning of a plant which is harmful to a plant, including but not limited to plant diseases (i.e. deviations from the normal physiological functioning of a plant) caused by a) fungi ("fungal plant disease"),
b) bacteria ("bacterial plant disease")
c) viruses ("viral plant disease"),
d) insect feeding damage,
e) plant nutrition deficiencies,
f) heat stress, for example temperature conditions higher than 30° C.,
g) cold stress, for example temperature conditions lower than 10° C.,
h) drought stress,
i) exposure to excessive sun light, for example exposure to sun light causing signs of scorch, sun burn or similar signs of irradiation,
j) acidic or alkaline pH conditions in the soil with pH values lower than pH 5 and/or pH values higher than 9,
k) salt stress, for example soil salinity,
l) pollution with chemicals, for example with heavy metals, and/or
m) fertilizer or crop protection adverse effects, for example herbicide injuries
n) destructive weather conditions, for example hail, frost, damaging wind A plant disease caused by fungi is referred to as a "fungal plant disease", a plant disease caused by bacteria is referred to as a "bacterial plant disease", a plant disease caused by viruses is referred to as a "viral plant disease". Preferably, the plant disease is a fungal, bacterial, or viral plant disease. More preferably, the plant disease is a fungal plant disease.

By way of example, fungal plant diseases may be assigned to or caused by one or more of the following agents: Phytopathogenic fungi, including soil-borne fungi, in particular from the classes of Plasmodiophoromycetes, Peronosporomycetes (syn. Oomycetes), Chytridiomycetes, Zygomycetes, Ascomycetes, Basidiomycetes, and Deuteromycetes (syn. Fungi imperfecti).

A comprehensive list of causal agents causing fungal plant diseases is given in the following: *Albugo* spp. (white rust) on ornamentals, vegetables (e. g. *A. candida*) and sunflowers (e. g. *A. tragopogonis*); *Alternaria* spp. (*Alternaria* leaf spot) on vegetables (e.g. *A. dauci* or *A. porri*), oilseed rape (*A. brassicicola* or *brassicae*), sugar beets (*A. tenuis*), fruits (e.g. *A. grandis*), rice, soybeans, potatoes and tomatoes (e. g. *A. solani, A. grandis* or *A. alternata*), tomatoes (e. g. *A. solani* or *A. alternata*) and wheat (e.g. *A. triticina*); *Aphanomyces* spp. on sugar beets and vegetables; *Ascochyta* spp. on cereals and vegetables, e. g. *A. tritici* (anthracnose) on wheat and *A. hordei* on barley; *Aureobasidium zeae* (syn. *Kapatiella zeae*) on corn; *Bipolaris* and *Drechslera* spp. (teleomorph: *Cochliobolus* spp.), e. g. Southern leaf blight (*D. maydis*) or Northern leaf blight (*B. zeicola*) on corn, e. g. spot blotch (*B. sorokiniana*) on cereals and e. g. *B. oryzae* on rice and turfs; *Blumeria* (formerly *Erysiphe*) *graminis* (powdery mildew) on cereals (e. g. on wheat or barley); *Botrytis cinerea* (teleomorph: *Botryotinia fuckeliana*: grey mold) on fruits and berries (e. g. strawberries), vegetables (e. g. lettuce, carrots, celery and cabbages); *B. squamosa* or *B. allii* on onion family, oilseed rape, ornamentals (e.g. *B eliptica*), vines, forestry plants and wheat; *Bremia lactucae* (downy mildew) on lettuce; *Ceratocystis* (syn. *Ophiostoma*) spp. (rot or wilt) on broad-leaved trees and evergreens, e. g. *C. ulmi* (Dutch elm disease) on elms; *Cercospora* spp. (*Cercospora* leaf spots) on corn (e. g. Gray leaf spot: *C. zeae-maydis*), rice, sugar beets (e. g. *C. beticola*), sugar cane, vegetables, coffee, soybeans (e. g. *C. sojina* or *C. kikuchii*) and rice; *Cladobotryum* (syn. *Dactylium*) spp. (e.g. *C. mycophilum*, formerly *Dactylium dendroides*, teleomorph: *Nectria albertinii, Nectria rosella* syn. *Hypomyces rosellus*) on mushrooms; *Cladosporium* spp. on tomatoes (e. g. *C. fulvum*: leaf mold) and cereals, e. g. *C. herbarum* (black ear) on wheat; *Claviceps purpurea* (ergot) on cereals; *Cochliobolus* (anamorph: *Helminthosporium* of *Bipolaris*) spp. (leaf spots) on corn (*C. carbonum*), cereals (e. g. *C. sativus*, anamorph: *B. sorokiniana*) and rice (e. g. *C. miyabeanus*, anamorph: *H. oryzae*); *Colletotrichum* (teleomorph: *Glomerella*) spp. (anthracnose) on cotton (e. g. *C. gossypii*), corn (e. g. *C. graminicola*: Anthracnose stalk rot), soft fruits, potatoes (e. g. *C. coccodes*: black dot), beans (e. g. *C. lindemuthianum*), soybeans (e. g. *C. truncatum* or *C. gloeosporioides*), vegetables (e.g. *C. lagenarium* or *C. capsici*), fruits (e.g. *C. acutatum*), coffee (e.g. *C. coffeanum* or *C. kahawae*) and *C. gloeosporioides* on various crops; *Corticium* spp., e. g. *C. sasakii* (sheath blight) on rice; *Corynespora cassiicola* (leaf spots) on soybeans, cotton and ornamentals; *Cycloconium* spp., e. g. *C. oleaginum* on olive trees; *Cylindrocarpon* spp. (e. g. fruit tree canker or young vine decline, teleomorph: *Nectria* or *Neonectria* spp.) on fruit trees, vines (e. g. *C. liriodendri*, teleomorph: *Neonectria liriodendri*: Black Foot Disease) and ornamentals; *Dematophora* (teleomorph: *Rosellinia*) *necatrix* (root and stem rot) on soybeans; *Diaporthe* spp., e. g. *D. phaseolorum* (damping off) on soybeans; *Drechslera* (syn. *Helminthosporium*, teleomorph: *Pyrenophora*) spp. on corn, cereals, such as barley (e. g. *D. teres*, net blotch) and wheat (e. g. *D. tritici-repentis*: tan spot), rice and turf; Esca (dieback, apoplexy) on vines, caused by *Formitiporia* (syn. *Phellinus*) *punctata, F. mediterranea, Phaeomoniella chlamydospora* (formerly *Phaeoacremonium chlamydosporum*), *Phaeoacremonium aleophilum* and/or *Botryosphaeria obtusa*; *Elsinoe* spp. on pome fruits (*E. pyri*), soft fruits (*E. veneta*: anthracnose) and vines (*E. ampelina*: anthracnose); *Entyloma oryzae* (leaf smut) on rice; *Epicoccum* spp. (black mold) on wheat; *Erysiphe* spp. (powdery mildew) on sugar beets (*E. betae*), vegetables (e. g. *E. pisi*), such as cucurbits (e. g. *E. cichoracearum*), cabbages, oilseed rape (e. g. *E. cruciferarum*); *Eutypa lata* (*Eutypa* canker or dieback, anamorph: *Cytosporina lata*, syn. *Libertella blepharis*) on fruit trees, vines and ornamental woods; *Exserohilum* (syn. *Helminthosporium*) spp. on corn (e. g. *E. turcicum*); *Fusarium* (teleomorph: *Gibberella*) spp. (wilt, root or stem rot) on various plants, such as *F. graminearum* or *F. culmorum* (root rot, scab or head blight) on cereals (e. g. wheat or barley), *F. oxysporum* on tomatoes, *F. solani* (f. sp. *glycines* now syn. *F. virguliforme*) and *F. tucumaniae* and *F. brasiliense* each causing sudden death syndrome on soybeans, and *F. verticillioides* on corn; *Gaeumannomyces graminis* (take-all) on cereals (e. g. wheat or barley) and corn; *Gibberella* spp. on cereals (e. g. *G. zeae*) and rice (e. g. *G. fujikuroi*: Bakanae disease); *Glomerella cingulata* on vines, pome fruits and other plants and *G. gossypii* on cotton; Grain-staining complex on rice; *Guignardia bidwellii* (black rot) on vines; *Gymnosporangium* spp. on rosaceous plants and junipers, e. g. *G. sabinae* (rust) on pears; *Helminthosporium* spp. (syn. *Drechslera*, teleomorph: *Cochliobolus*) on corn, cereals, potatoes and rice; *Hemileia* spp., e. g. *H. vastatrix* (coffee leaf rust) on coffee; *Isariopsis clavispora* (syn. *Cladosporium vitis*) on vines; *Macrophomina phaseolina* (syn. *phaseoli*) (root and stem rot) on soybeans and cotton; *Microdochium* (syn. *Fusarium*) *nivale* (pink snow mold) on cereals (e. g. wheat or barley); *Microsphaera diffusa* (powdery mildew) on soybeans; *Monilinia* spp., e. g. *M. laxa*, *M. fructicola* and *M. fructigena* (syn. *Monilia* spp.: bloom and twig blight, brown rot) on stone fruits and other rosaceous plants; *Mycosphaerella* spp. on cereals, bananas, soft fruits and ground nuts, such as e. g. *M. graminicola* (anamorph: *Zymoseptoria tritici* formerly *Septoria tritici*: Septoria blotch) on wheat or *M. fijiensis* (syn. *Pseudocercospora fijiensis*: black Sigatoka disease) and *M. musicola* on bananas, *M. arachidicola* (syn. *M. arachidis* or *Cercospora arachidis*), *M. berkeleyi* on peanuts, *M. pisi* on peas and *M. brassiciola* on brassicas; *Peronospora* spp. (downy mildew) on cabbage (e. g. *P. brassicae*), oilseed rape (e. g. *P. parasitica*), onions (e. g. *P. destructor*), tobacco (*P. tabacina*) and soybeans (e. g. *P. manshurica*); *Phakopsora pachyrhizi* and *P. meibomiae* (soybean rust) on soybeans; *Phialophora* spp. e. g. on vines (e. g. *P. tracheiphila* and *P. tetraspora*) and soybeans (e. g. *P. gregata*: stem rot); *Phoma lingam* (syn. *Leptosphaeria biglobosa* and *L. maculans*: root and stem rot) on oilseed rape and cabbage, *P. betae* (root rot, leaf spot and damping-off) on sugar beets and *P. zeae-maydis* (syn. *Phyllostica zeae*) on corn; *Phomopsis* spp. on sunflowers, vines (e. g. *P. viticola*: can and leaf spot) and soybeans (e. g. stem rot: *P. phaseoli*, teleomorph: *Diaporthe phaseolorum*); *Physoderma maydis* (brown spots) on corn; *Phytophthora* spp. (wilt, root, leaf, fruit and stem root) on various plants, such as paprika and cucurbits (e. g. *P. capsici*), soybeans (e. g. *P. megasperma*, syn. *P. sojae*), potatoes and tomatoes (e. g. *P. infestans*: late blight) and broad-leaved trees (e. g. *P. ramorum*: sudden oak death); *Plasmodiophora brassicae* (club root) on cabbage, oilseed rape, radish and other plants; *Plasmopara* spp., e. g. *P. viticola* (grapevine downy mildew) on vines and *P. halstedii* on sunflowers; *Podosphaera* spp. (powdery mildew) on rosaceous plants, hop, pome and soft fruits (e. g. *P. leucotricha* on apples) and curcurbits (*P. xanthii*); *Polymyxa* spp., e. g. on cereals, such as barley and wheat (*P. graminis*) and sugar beets (*P. betae*) and thereby transmitted viral diseases; *Pseudocercosporella herpotrichoides* (syn. *Oculimacula yallundae, O. acuformis*: eyespot, teleomorph: *Tapesia yallundae*) on cereals, e. g. wheat or barley; *Pseudoperonospora* (downy mildew) on various plants, e. g. *P. cubensis* on cucurbits or *P. humili* on hop; *Pseudopeziculae tracheiphila* (red fire disease or 'rotbrenner', anamorph: *Phialophora*) on vines; *Puccinia* spp. (rusts) on various plants, e. g. *P. triticina* (brown or leaf rust), *P. striiformis* (stripe or yellow rust), *P. hordei* (dwarf rust), *P. graminis* (stem or black rust) or *P. recondita* (brown or leaf rust) on cereals, such as e. g. wheat, barley or rye, *P. kuehnii* (orange rust) on sugar cane and *P. asparagi* on asparagus; *Pyrenopeziza* spp., e.g. *P. brassicae* on oilseed rape; *Pyrenophora* (anamorph: *Drechslera*) *tritici-repentis* (tan spot) on wheat or *P. teres* (net blotch) on barley; *Pyricularia* spp., e. g. *P. oryzae* (teleomorph: *Magnaporthe grisea*: rice blast) on rice and *P. grisea* on turf and cereals; *Pythium* spp. (damping-off) on turf, rice, corn, wheat, cotton, oilseed rape, sunflowers, soybeans, sugar beets, vegetables and various other plants (e. g. *P. ultimum* or *P. aphanidermatum*) and *P. oligandrum* on mushrooms; *Ramularia* spp., e. g. *R. collo-cygni* (*Ramularia* leaf spots, Physiological leaf spots) on barley, *R. areola* (teleomorph: *Mycosphaerella areola*) on cotton and *R. beticola* on sugar beets; *Rhizoctonia* spp. on cotton, rice, potatoes, turf, corn, oilseed rape, potatoes, sugar beets, vegetables and various other plants, e. g. *R. solani* (root and stem rot) on soybeans, *R. solani* (sheath blight) on rice or *R. cerealis* (*Rhizoctonia* spring blight) on wheat or barley; *Rhizopus stolonifer* (black mold, soft rot) on strawberries, carrots, cabbage, vines and tomatoes; *Rhynchosporium secalis* and *R. commune* (scald) on barley, rye and triticale; *Sarocladium oryzae* and *S. attenuatum* (sheath rot) on rice; *Sclerotinia* spp. (stem rot or white mold) on vegetables (*S. minor* and *S. sclerotiorum*) and field crops, such as oilseed rape, sunflowers (e. g. *S. sclerotiorum*) and soybeans, *S. rolfsii* (syn. *Athelia rolfsii*) on soybeans, peanut, vegetables, corn, cereals and ornamentals; *Septoria* spp. on various plants, e. g. *S. glycines* (brown spot) on soybeans, *S. tritici* (syn. *Zymoseptoria tritici, Septoria* blotch) on wheat and *S.* (syn. *Stagonospora*) *nodorum* (*Stagonospora* blotch) on cereals; *Uncinula* (syn. *Erysiphe*) *necator* (powdery mildew, anamorph: *Oidium tuckeri*) on vines; *Setosphaeria* spp. (leaf blight) on corn (e.g. *S. turcicum*, syn. *Helminthosporium turcicum*) and turf; *Sphacelotheca* spp. (smut) on corn, (e.g. *S. reiliana*, syn. *Ustilago reiliana*: head smut), sorghum and sugar cane; *Sphaerotheca fuliginea* (syn. *Podosphaera xanthii*: powdery mildew) on cucurbits; *Spongospora subterranea* (powdery scab) on potatoes and thereby transmitted viral diseases; *Stagonospora* spp. on cereals, e.g. *S. nodorum* (*Stagonospora* blotch, teleomorph: *Leptosphaeria* [syn. *Phaeosphaeria*] *nodorum*, syn. *Septoria nodorum*) on wheat; *Synchytrium endobioticum* on potatoes (potato wart disease); *Taphrina* spp., e.g. *T. deformans* (leaf curl disease) on peaches and *T. pruni* (plum pocket) on plums; *Thielaviopsis* spp. (black root rot) on tobacco, pome fruits, vegetables, soybeans and cotton, e.g. *T. basicola* (syn. *Chalara elegans*); *Tilletia* spp. (common bunt or stinking smut) on cereals, such as e.g. *T. tritici* (syn. *T. caries*, wheat bunt) and *T. controversa* (dwarf bunt) on wheat; *Trichoderma harzianum* on mushrooms; *Typhula incarnata* (grey snow mold) on barley or wheat; *Urocystis* spp., e.g. *U. occulta* (stem smut) on rye; *Uromyces* spp. (rust) on vegetables, such as beans (e.g. *U. appendiculatus*, syn. *U. phaseoli*), sugar beets (e.g. *U. betae* or *U. beticola*) and on pulses (e.g. *U. vignae, U. pisi, U. viciae-fabae* and *U. fabae*); *Ustilago* spp. (loose smut) on cereals (e.g. *U. nuda* and *U. avaenae*), corn (e.g. *U. maydis*: corn smut) and sugar cane; *Venturia* spp. (scab) on apples (e.g. *V. inaequalis*) and pears; and *Verticillium* spp. (wilt) on various plants, such as fruits and ornamentals, vines, soft fruits, vegetables and field crops, e.g. *V. longisporum* on oilseed rape, *V. dahliae* on strawberries, oilseed rape, potatoes and tomatoes, and *V. fungicola* on mushrooms; *Zymoseptoria tritici* on cereals.

A particularly preferred list of causal agents causing practically important or preferred fungal plant diseases is given in the following: Rusts on soybean and cereals (e.g. *Phakopsora pachyrhizi* and *P. meibomiae* on soy; *Puccinia tritici* and *P. striiformis* on wheat); molds on specialty crops, soybean, oil seed rape and sunflowers (e.g. *Botrytis cinerea* on strawberries and vines, *Sclerotinia sclerotiorum, S. minor* and *S. rolfsii* on oil seed rape, sunflowers and soybean); *Fusarium* diseases on cereals (e.g. *Fusarium culmorum* and *F. graminearum* on wheat); downy mildews on specialty crops (e.g. *Peronospora parasitica* on vines, *Phytophthora infestans* on potatoes); powdery mildews on specialty crops and cereals (e.g. *Uncinula necator* on vines, *Erysiphe* spp. on various specialty crops, *Blumeria graminis* on cereals); and leaf spots on cereals, soybean and corn (e.g. *Septoria tritici* and *S. nodorum* on cereals, *S. glycines* on soybean, *Cercospora* spp. on corn and soybean).

It is to be noted that there is no consensus in the prior art on the necessity of creating specific network models for the identification of the diseases for each crop or if it is more efficient to create a single model capable of simultaneously identifying diseases for any of the analyzed plant species. The probability of the existence of different disorders with similar symptoms is greater, especially for early symptoms, when using a multi-crop model and this will increase the possibilities of miss-classifications. On the other hand, training a model over a larger dataset with higher variability will lead to learning richer and more robust visual features that are shared for all crops.

As these models grow both in the number of training images and in the number of supported crops and diseases, there exists the dichotomy of generating a smaller model for a specific crop which is a much simpler task or to generate a unique multi-crop model in a much more complex task (specially at early disease stages) but with the benefit of using the entire multiple crop image dataset that encompass much more image variability.

The above technical problem is solved by using a CNN architecture that is able to seamlessly incorporate contextual meta-data including the plant species information (and optionally, further crop related meta-data such as for example, weather data, temperature, data etc., prevailing at the respective field) to allow training a single multi-crop model that:

obtains richer and more robust shared visual features than the single crop counterparts, does not suffer from the presence of different disorders with similar symptoms from the different crops, and and seamlessly integrates contextual meta-data to perform crop-conditional disease classification.

For the approach disclosed herein, the wheat dataset used by the Picon et al. paper containing 8178 field images was extended. The extended dataset includes *Septoria* (*Septoria triciti*), Tan Spot (*Drechslera triciti-repentis*) and Rust (*Puccinia striiformis, Puccinia recondita*) diseases over more than 36 wheat plant varieties. Three new crops have been added to the existing winter wheat (*Triticum aestivum*) species: Corn (*Zea mays*), Rape seed (*Brassica napus*) and Winter barley (*Hordeum vulgare*).

The number of winter wheat diseases have been extended including five different diseases (*Septoria tritici, Puccinia striiformis, Puccinia recondita, Septoria nodorum* and *Drechslera tritici-repentis*). For corn, the *Helminthosporium turcicum* disease has been included in the database, whereas rape seed crop includes *Phoma lingam* disease and winter barley crop includes four different diseases: *Pyrenophora teres, Ramularia collo-cygni, Rhynchosporium secalis* and *Puccinia hordei*, containing a total number of 100734 images, as shown in the reference table 1 of FIG. 7A.

When applying the existing prior art CNN topologies for a multi-crop disease identification task trained by a complete multi-crop dataset where different disorders with similar symptoms are present, the overall performance of the trained model is drastically reduced. Further, the generation of separate classification models for each crop does not take advantage of the information from other crops specially for crops and/or diseases with a low number of images. That is, there is no synergy derived from information across multiple crops.

The herein disclosed approach of using an extended CNN topology integrating plant species information as complementary information to the input image over a complete multi-crop dataset surpasses the performance obtained by the two methods mentioned before by taking advantage on the visual information and variability from the full dataset and not suffering from the effect of diseases with similar appearance from other crops. In general, the topology of a neural network refers to the way the neurons are connected in the neural network.

For this purpose a dataset of one hundred-thousand images is validated containing equally distributed disease stages of twelve diseases and four crops (wheat, barley, corn and rapeseed) in that disease classification models trained independently for each crop dataset obtain lower performance (BAC=0.85) than a unique model trained for the multi-crop task by the use of the entire dataset (BAC=0.94). The proposed new CNN architecture with the extended topology as described in the independent claims is able to incorporate crop species information in addition to the image input showing a part of the crop plant to be analyzed. This combines the advantages of on the one hand reducing the complexity of the classification task to the complexity of the single crop approach while on the other hand allowing the use of the entire multi-crop dataset for training. The proposed network obtains a balanced accuracy BAC of 0.97 improving all known prior art methods.

In one embodiment, computer system is provided for detecting plant diseases. The computer system has a data storage component which stores a convolutional neural network (CNN) data structure. The CNN has been trained with a multi-crop dataset. This training dataset includes a plurality of input images which shows parts (or elements, such as leaves) of various crops. Thereby, each of the input images in the training data set shows either a part of a particular crop with one or more disease symptoms associated with one or more diseases of interest, or it shows a part of a particular crop with abiotic marks, or it shows a healthy part of a particular crop. Diseases of interest, as used herein, are such diseases for which the CNN has been trained and is therefore expected to provide meaningful classification results of input images which show crop parts with symptoms that are representative of at least one of the diseases of interest. In other words, the input images used for training the CNN include all kinds of plant elements of the various crops wherein the plant elements may appear healthy or show certain disease symptoms or show markers which are not representative of a disease of interest. For achieving good classification results, all of those three image categories should be present on a number of training input images which is sufficient to establish the corresponding weights in the CNN.

The CNN has an extended topology which includes an image branch based on a classification convolutional neural network (e.g., a RESNET* architecture, such as for example a RESNET50 topology, DenseNet, VGGNet, etc.) for classifying the input images according to plant disease specific features. Further, the extended topology has a crop identification branch for adding plant species information. Such plant species information can be a crop identifier. For example, the crop identifier can be a categorical vector of K components where K is the number of crop classes (i.e., number of different types of crop) considered when training the CNN model, and may be represented by a corresponding tensor or vector. It is to be noted that in some embodiments, further meta-data (e.g., weather or temperature conditions in the field) may also be added via the crop identification branch. The outputs of the image branch and the crop identification branch are then integrated by a branch integrator of the extended topology which is configured to integrate the plant species information with each input image wherein the plant species information specifies the crop on the respective input image with which it gets integrated. Training methods for the CNN with the extended topology are disclosed in more detail in the detailed description.

The computer system further has an interface to receive a test input with an image of a particular crop showing one or more particular plant disease symptoms. This image is to be classified by the computer system according to potential diseases in accordance with its plant disease symptom(s). Further, via the interface, the computer system receives a respective crop identifier associated with the test input. For example, a farmer may find a crop leaf in an agricultural field showing some markers which have similarity with plant disease symptoms. The farmer can take a picture of the crop part with the symptoms, for example by using an RGB camera of a mobile device (e.g., smart phone, tablet computer, etc.) which is communicatively coupled with the computer system via a communication network. The farmer also knows which kind of crop it is and can send the image together with a corresponding crop identifier to the computer system where it is received via said interface. Of course, the images may be recorded with any other suitable image recording device, such as for example, a DSLR camera, or a multi-spectral camera. The camera device does not need to be handheld but may also be mounted on a robot, a tractor or a drone. For example, by using drones, images of plants in a field can easily be taken from a zenithal view.

The computer system can then apply the trained convolutional network to the received test input including the test image and the crop identifier. When the trained CNN is applied to test input images associated with crop identifier information it is operated as a classifier module of the computer system and provides a classification result according to the output vector of the convolutional neural network. The classification result indicates the one or more plant diseases associated with the one or more particular plant disease symptoms on the test input image. The classification result may be shown on an output device communicatively coupled with the computer system. For example, in the above farmer example, the classification result can be sent to the farmer's mobile device in response to the test input. It has been demonstrated that even when the crop ID is introduced erroneously the computer system can still provide better plant disease detection capabilities than the prior art systems.

In one embodiment, the computer system may also include a training module which can access an appropriate training dataset to train the CNN with a number of training input images being large enough to achieve a stable configuration of the CNN to provide reliable crop disease classification results. The training data set includes for each training image the associated crop identifier and the associated set of disease identifiers (i.e., the identifiers of such diseases which are present on the training image). Alternatively, the training of the CNN may occur in a dedicated training system and the trained CNN data structure is then copied to the data storage of the computer system.

In one embodiment, the computer system further includes an image cropping module configured to crop a new input image including a plant portion of the crop (e.g., a particular leaf, stem, panicle, etc.) to a region surrounding such plant portion. Cropping in general is the removal of unwanted outer areas from a photographic or illustrated image. The process usually includes the removal of some of the peripheral areas of an image to remove extraneous trash from the picture, to improve its framing, to change the aspect ratio, or to accentuate or isolate the subject matter from its background, and/or focus on the subtle early symptoms of smaller size that might otherwise be lost from the whole picture. In one embodiment, the main leaf may be segmented by a segmentation neural network with a pixel-wise categorical cross-entropy loss function being complemented with a total variation term. Alternatively, any segmentation neural network may be used that manages to perform a decent segmentation, such as for example, a fully convolutional dense net, PSPNet, SegNet, etc. Typically, such networks are trained with the above mentioned categorical cross-entropy loss, but there are other options, such as for example binary crossentropy, Jackard index, Sorensen-Dice coefficient among others. Further, some segmentation networks do not use a total variation term for training.

In the following, three different implementations of the extended CNN topology are disclosed.

In a first implementation, the CNN topology includes a backbone topology implemented by a classification convolutional neural network topology configured to gradually reduce the dimensionality of the image representation in the spatial domain while growing on the feature domain to learn image representations as sets of high level features. For example, the backbone topology may be pre-trained with Imagenet or another dataset suitable for posterior fine-tuning for crop disease identification. For example, a residual neural network may be used as backbone, such as for example the ResNet50 deep convolutional neural network with 50 layers. Other variants of the ResNet family (e.g., ResNet101, ResNet152, SE-ResNet, ResNeXt, SE-ResNeXt, or SENet154) or other image classification CNN families (e.g. DenseNet, Inception, MobileNet, EfficientNet, Xception or VGG) may be used as well. In section 4 of the above cited Picon et al. paper, a detailed description of the architecture of a ResNet50 backbone is given in the plant disease detection context. However, the skilled person may also use other classification CNNs as backbone topology. Further, other kinds of pre-training/initialization may be used including but not being limited to: Imagenet-based pre-training, crop (not crop disease) identification, or initialization with random weights (i.e. training the backbone from scratch). In an advantageous implementation the backbone is trained on a joint Imagenet+crop disease identification dataset.

An image representation layer with an average pooling operation follows the backbone topology. That is, the output of the backbone feeds into the image representation layer which then integrates the high-level features of the input image. Whereas low-level features are minor details of the image, like lines or dots, that can be picked up by a convolutional filter or by SIFT or HOG algorithms (e.g., responding to edges/gradients and corners which are considered as low-level features in a visual processing pipeline), high-level features of an image are built on top of low-level features to detect objects and larger shapes in the image. The image representation layer is actually not performing any kind of operation. It is to be noted that sometimes in the context of neural networks the term "layer" is used only for layers performing actual operations. However, as used herein, the term "layer" as used with the "image representation layer" also relates to the output "tensor" resulting from the operation performed in a preceding layer. Then, a reshaping operation matches the dimensions of the average pooling output with the dimensions of the crop identification branch. The reshaping operation does not modify any of the numbers in the CNN but merely looks at the numbers in a different way. In other words, reshaping is just a way of representing the output or any intermediate tensor/representation in a desired way.

The image representation layer is then followed by a concatenation layer aggregating the crop identifier received via the crop identification branch into the output of the image representation layer by combining image descriptive features from the image representation layer with the information of the plant species present on the respective image. In this embodiment, the crop identifier branch can be seen as a bypass to the backbone where the crop identifier information is directly merged with the image branch output in the concatenation layer. For example, the crop identifier can be a categorical vector of K components where K is the number of crop classes (i.e., number of different types of crop) considered when training the CNN model. In such case, this vector has value "1" at the component corresponding to its crop class and value "0" for the other components. The crop vector is directly aggregated by the concatenation layer into the image representation layer. This yields a joint activation that combines the image descriptive features from the image representation layer with the information of the plant species (crop) that is shown on the image.

The concatenation layer is then followed by a dense layer (all neurons connected with all inputs and all outputs) to map relationships between image high level features and respective crops with disease predictions using a sigmoid activation function. Alternatively, there can be more stacked layers for implementing the post-branch-fusion of the image and crop identifier branches. This subsequent fully connected layer is responsible of mapping the relationships between the image high level features and the respective crop with disease predictions.

For the above extended CNN topology, the visual feature representation at the image representation layer and the subsequent crop-disease mapping are jointly learned (i.e., in the same training run). The backbone however may be pre-trained with a dataset suitable for posterior fine-tuning, such as for example, the Imagenet dataset. Typical fine-tuning comprises freezing the weights from the first layers of the backbone network and performing a training where only the weights from the latter layers are modified. This maintains the low-level description trained from the pre-training dataset and modifies only the high level mapping. That is, in a typical setup, initially the backbone is trained and then the image representation layer and the subsequent crop-disease mapping are jointly trained. The learned visual features that are shared by all crops lead to a richer dataset representation In a second implementation, the convolutional neural network topology again includes a backbone topology implemented by a classification convolutional neural network topology configured to gradually reduce the dimensionality of the image representation in the spatial domain while growing on the feature domain to learn image representations as sets of high-level features. Again, the backbone topology may be pre-trained with a dataset for crop disease identification as described earlier. The backbone may be the same as in the first implementation. As in the first implementation, the backbone topology is followed by an image representation layer with an average pooling operation integrating the high level features, and by a reshaping operation matching the dimensions of the average pooling output with the dimensions of the crop identification branch. Also, the image representation layer may be the same as in the first implementation.

However, the second implementation follows a different motivation than the first implementation. Here, the crop identifier vector is not concatenated as an additional feature as in the topology of the first implementation. Instead it is used to suppress the activation of certain visual features in case they are irrelevant for the plant species that is shown on the present test image.

In this implementation, the crop identification branch is not simply bypassing the backbone but has a dense layer directly connected to the crop identifier. The number of neurons of the dense layer corresponds to the number of features at the image representation layer. A sigmoid activation function is used to map the resulting output of the dense layer into the range of [0, 1]. This implementation may be considered as the most simple case. In general, the crop identifier branch can be any CNN/set of layers that maps the crop identifier input to the crop identifier representation tensor/vector.

The outputs of the image representation layer and the dense layer feed into a multiplication layer to integrate the output of the sigmoid activation function with the image representation layer by an elementwise multiplication. In this way, the plant species (crop) that is shown on the image modulates the response of the learned visual descriptors, thus reducing the effect of the inconsistent ones.

The multiplication layer is then followed by a further dense layer to map relationships between image high level features and respective crops with disease predictions by using a further sigmoid activation function. Alternatively, there can be more stacked layers for implementing the post-branch-fusion of the image and crop identifier branches. Again, in this second implementation, the visual feature representation at the image representation layer and the subsequent crop-disease mapping are jointly learned.

In a third implementation, also the concept of multiplicative suppression of activations is used. However, in this case, the suppression is performed directly over the final predictions of the CNN, just suppressing the activation of diseases which are not present on the represented plant-species. That is, diseases which are inconsistent with the crop identifier are suppressed. A disease is inconsistent with the crop identifier it the disease does not occur for the crops belonging to the crop type represented by the crop identifier.

The convolutional neural network topology again includes a backbone topology implemented by a classification convolutional neural network topology configured to gradually reduce the dimensionality of the image representation in the spatial domain while growing on the feature domain to learn image representations as sets of high-level features. The backbone topology may be pre-trained for crop disease identification. The backbone may be the same as in the first implementation. As in the first implementation, the backbone topology is followed by an image representation layer with an average pooling operation integrating the high level features.

The image representation layer is the followed by a first dense layer to map image high level features to disease predictions using a first sigmoid activation function.

A second dense layer in the crop identification branch is directly connected to the crop identifier, with the number of neurons of the fully connected dense layer corresponding to the number of features at the image representation layer. A second sigmoid activation function is used to map the resulting output of the second dense layer into the range of [0, 1]. Again, in this implementation in general, the crop identifier branch can be any CNN/set of layers that maps the crop identifier input to the crop identifier representation tensor/vector.

The first and second dense layers with their sigmoid activation functions are followed by a multiplication layer to suppress activations of diseases predicted by the first dense layer but not present on the plant species represented by the crop identifier. This is again achieved by performing an elementwise multiplication of the activations.

Again, the visual feature representation at the image representation layer and the subsequent crop-disease mapping are jointly learned.

Further aspects of the invention will be realized and attained by means of the elements and combinations particularly depicted in the appended claims. It is to be understood that both, the foregoing general description and the following detailed description are exemplary and explanatory only and are not restrictive of the invention as described.

SHORT DESCRIPTION OF THE FIGURES

FIG. 1 includes a block diagram of a computer system for detecting plant diseases according to an embodiment;

FIGS. 6A, 6B, 6C illustrate various examples of input images;

FIG. 7A is a table reflecting a training database for training the convolutional neural network;

Figure 8:
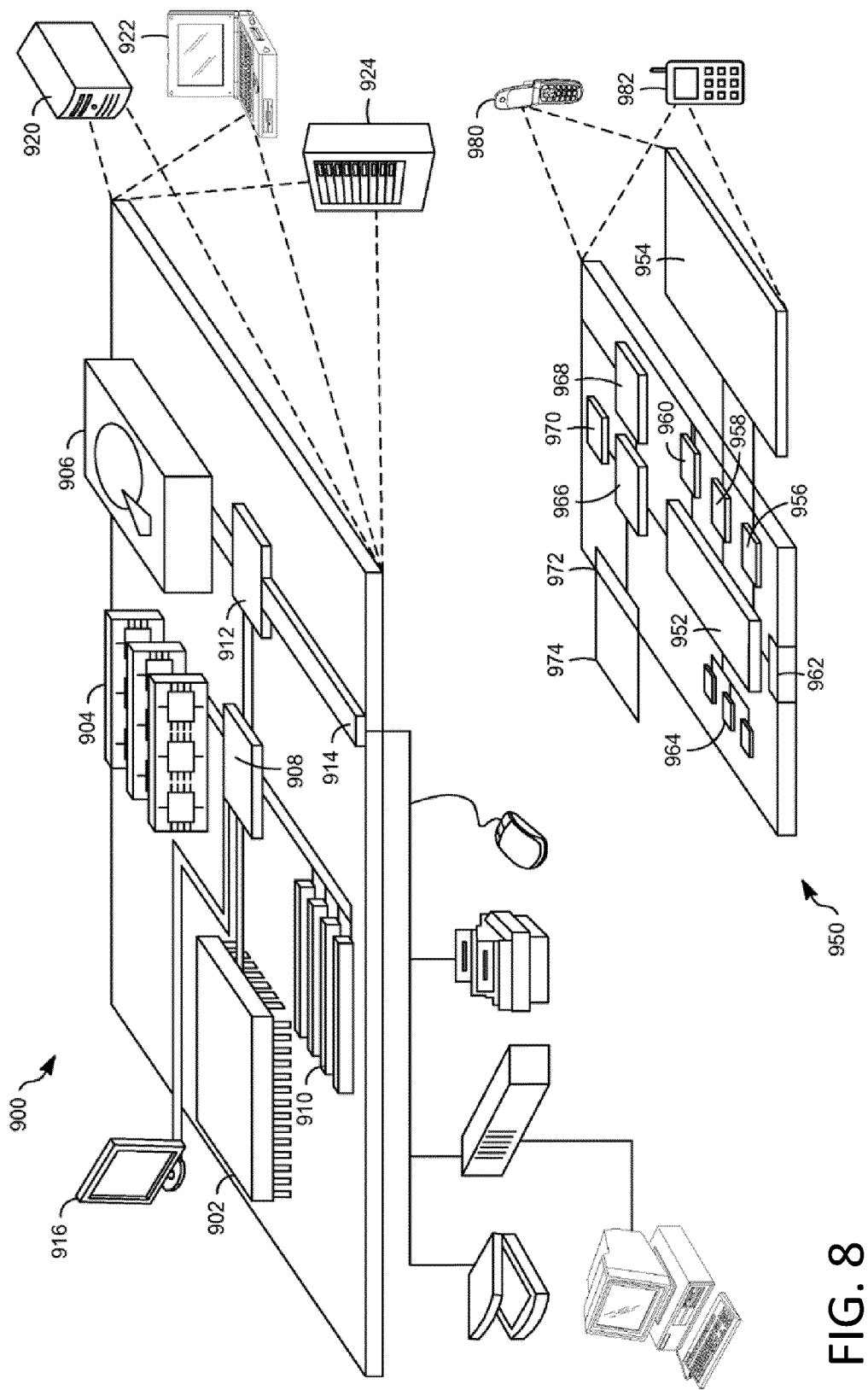

FIGS. 7B to 7D include tables illustrating metrics to measure the performance of the convolutional neural network algorithm for prior art backbone neural networks and for a convolutional neural network with an extended topology;

FIG. 8 is a diagram that shows an example of a generic computer device and a generic mobile computer device, which may be used with the techniques described herein.

DETAILED DESCRIPTION

Figure 1:
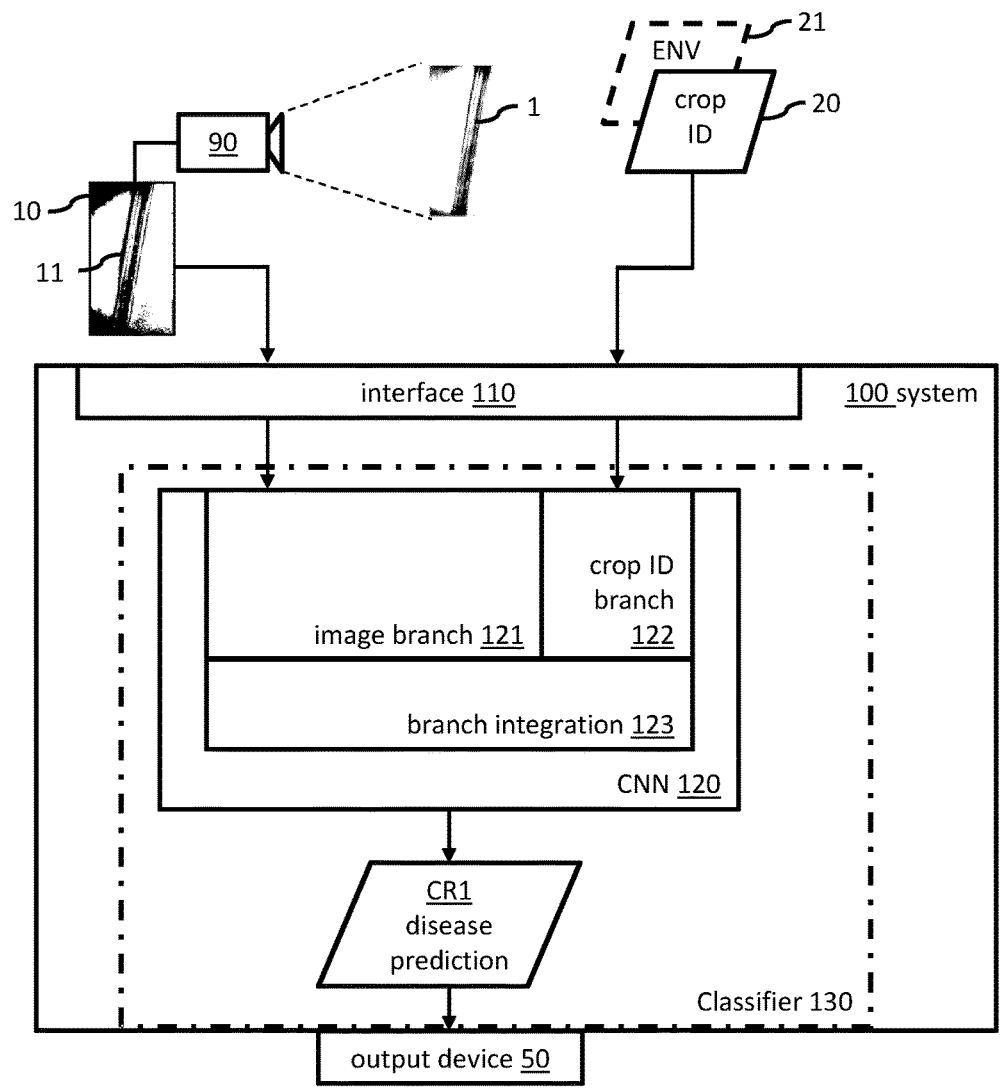
Figure 2:
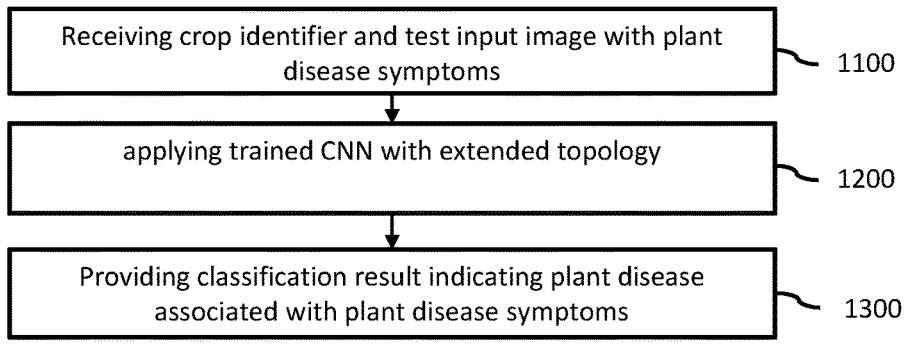
FIG. 2 is a simplified flow chart of a computer-implemented method for according to an embodiment.

FIG. 1 illustrates a block diagram of a computer system 100 for detecting plant diseases. The system has an interface 110 which allows to receive external data 10, 20. The computer system 100 can be operated to execute a computer-implemented method 1000 for detecting plant diseases as illustrated by the simplified flow chart of FIG. 2. FIG. 1 is described in the context of FIG. 2. The following description therefore refers to reference numbers of FIG. 1 and FIG. 2 where appropriate.

Via the interface 110, computer system 100 receives images (e.g., test input image 10) of a particular crop 1 showing one or more particular plant disease symptoms. For examples, such test input images may be recorded with a camera device 90. For example, a user (e.g., a farmer) in a field may use a digital camera (e.g., the camera of a smartphone or tablet computer) which is connected to a communication network (e.g., a mobile communication network) allowing to transmit the image data to the computer system 100. The user can then take photos of various crop parts (e.g., the leaves or other parts of the crop plant) which appear to show symptoms of plant disease(s). It is assumed that a particular transmitted input image 10 shows at least a portion 11 of said particular crop 10. Further, the user in the field typically is aware of the type of crop which is grown in said field. Therefore, the user transmits a corresponding crop identifier 20 (crop ID) associated with the input image 10. The crop ID and test input image is then received 1100 by the computer system 100 via the interface 110. Optionally, the user may provide further information 21 to the computer system. Such additional data 21 may relate to further external data specifying particular environmental conditions associated with the respective crop in the field. For example, weather conditions, soil conditions, or other environmental data which may have an impact on plant diseases may also be received by the computer system.

The computer system 100 includes modules which are adapted to detect the presence of one or more plant diseases present on the crop 1 by applying 1200 advanced image processing to the corresponding test input image 10 in combination with the received crop ID information. One of such modules is implemented as a convolutional neural network 120 (CNN) which is stored in a data storage component of the computer system 100. The CNN 120 is part of a classifier 130 implemented by the computer system which provides predictions about potential diseases to an output device 50. For example, the output device 50 can be the same device which is used by the user for providing the test input to the computer system. That is, the user may take a photo of the crop 1 and transmit the photo together with the crop ID to the computer system, and in turn the user receives from the computer system the disease predictions made by the classifier 130 as the system response.

In one embodiment, the computer system may further include an image cropping (or cutting) module configured to crop (cut) a new input image, including a plant main portion with a main leaf or main stem or main panicle of the crop, to a region surrounding the main portion. The main leaf can be segmented by a segmentation neural network with a pixel-wise categorical cross-entropy loss function being complemented with a total variation term. Such a leaf-mask crop approach is described in detail in Picon et al. (2018).

CNN 120 is pre-trained with a multi-crop dataset. The training dataset includes input images showing various crops (i.e. different types of crops). Each of the training input images shows a part of a particular crop. Thereby, the training data set includes images with one or more disease symptoms associated with one or more diseases of interest, and images showing a part of a particular crop with abiotic marks (marks related to non-living parts of any habitat), and images showing a healthy part of a particular crop. In other words, the training data set includes images with indicators for biotic and abiotic stress factors for the plants, such as for example: insect feeding damage, nutrition deficiencies, drought stress, viruses, bacteria, healing damage, sunburn, etc.

For the herein disclosed work, the wheat dataset used at Picon et al. (2018) containing 8178 images from the field has been extended. This dataset included *Septoria* (*Septoria triciti*), Tan Spot (*Drechslera triciti-repentis*) and Rust (*Puccinia striiformis, Puccinia recondita*) diseases over more than 36 wheat plant varieties. Three new crops have been added to the existing winter wheat (*Triticum aestivum*) specie: Corn (*Zea mays*), Rape seed (*Brassica napus*) and Winter barley (*Hordeum vulgare*).

The number of winter wheat diseases have been extended including five different diseases (*Septoria tritici, Puccinia*

*striiformis, Puccinia recondita, Septoria nodorum* and *Drechslera tritici-repentis*). For corn, *Helminthosporium turcicum* disease has been included in the database whereas rape seed crop includes *Phoma lingam* disease and winter barley crop includes four different diseases: *Pyrenophora teres, Ramularia collo-cygni, Rhynchosporium secalis* and *Puccinia hordei* containing a total number of 100734 images as shown in Table 1 of FIG. 7A.

For an optimal pest control, it is advantageous to detect diseases at the early stages of symptoms development to assure appropriate and efficient measures adapted to the respective stage of the infection. Because of this, the generated training dataset contains images at four different stages of infection with approximately equal shares (e.g., shares between 15% and 35%) in the number of input images used for the training of the convolutional neural network belonging to the various stages of the infection. For example, approximately, 25% of the images belong to initial stages of the infection, 25% to early stages, 25% to medium stages and 25% to advanced stages. In case more stages of infection are defined, the percentages of the shares are adjusted accordingly. This generates a high complexity dataset where, especially for early symptoms, different diseases produced similar or slightly different symptoms that are difficult to cope with using common algorithms. Examples of pictures in the dataset are presented in FIGS. 6A, 6B, 6C.

Figure 6A:
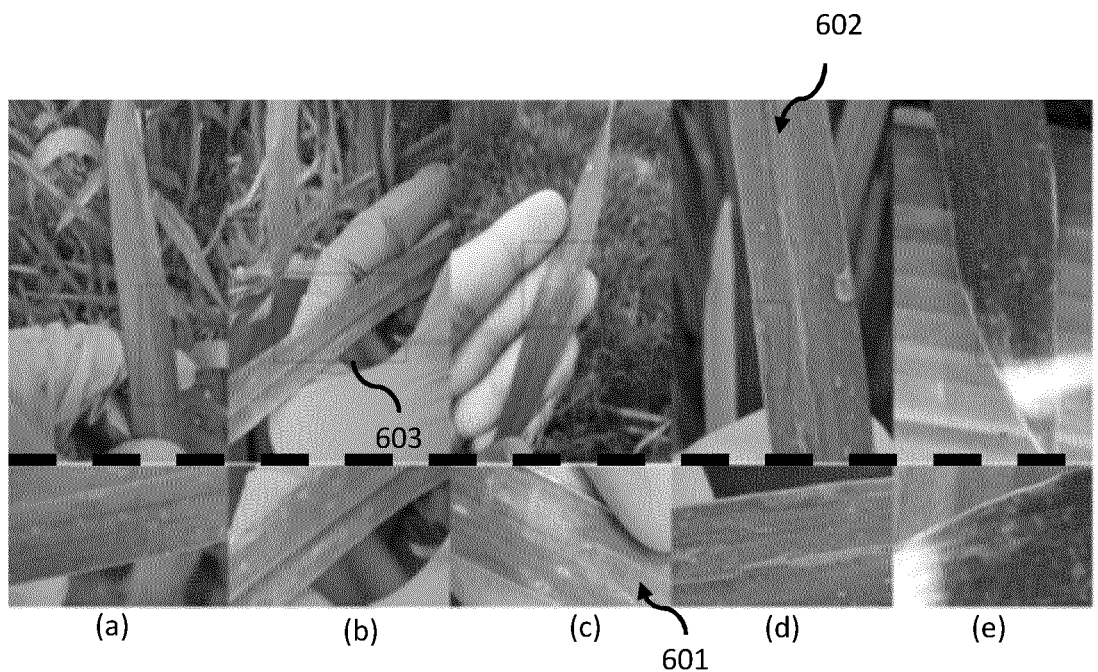
Figure 6B:
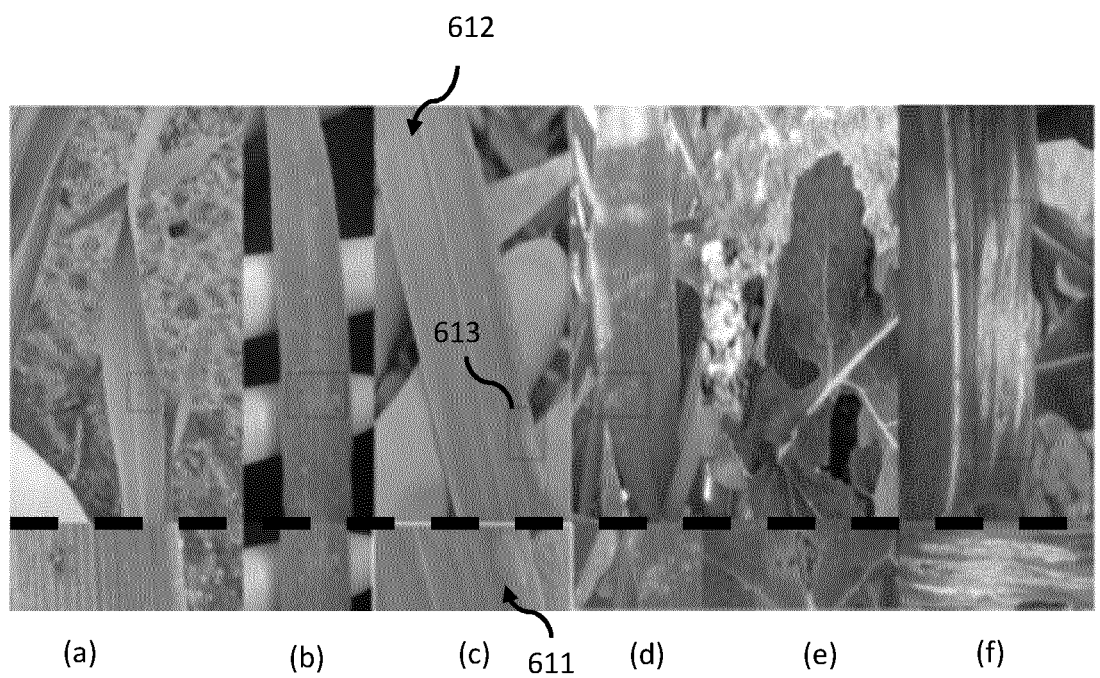

The training dataset includes diseases that generate very similar symptoms, especially on early stages. In this sense, before the typical visual appearance of a disease occur, a very common effect is that the leaves show different shapes of chloroses. Not only for biotic stress, but also for abiotic stress, thus further complicating the exact determination of the disease. For example, the initial symptoms in Wheat of *Puccinia recondita* and *Puccinia striiformis* and also in Barley of *Ramularia collo-cygni* and *Puccinia hordei* show very similar chloroses as seen in FIGS. 6A and 6B brightening of small patches with slight differences in color and shape. When the typical cluster of spores on the chloroses occurs, the curative treatment is mostly too late, which underlines the difficulty and importance of the early detection. In addition, there are also diseases where not only early infestations appear quite similar but also the advanced stages are difficult to distinguish. Regarding *Septoria tritici* and *Septoria nodorum* both have analogical disease progression. First chloroses can be seen, which evolve to necroses, and in the end brown or black pycnidia occur on the necroses.

The pictures were acquired from the upper leaf surface or from other plant portions, such as for example, the stem or the panicle. They were photographed avoiding direct light. No other limitations were imposed to the technicians to simulate real acquisition conditions. The use of additional normalization color elements was avoided as they are unpractical for field image acquisition as shown in Johannes et al. (2017. Automatic plant disease diagnosis using mobile capture devices, applied on a wheat use case. Computers and Electronics in Agriculture 138, 200-209.). All new images were cropped (cut) to the region surrounding their main leaf following the Leaf-mask crop approach proposed by Picon et al. (2018). To do this, the main leaf or main stem or main panicle at each image was automatically segmented by a fully convolutional DenseNet network (Jégou et al. (2017)) where the pixel-wise categorical cross-entropy loss function was complemented with a total variation term that penalizes segmentation of irregular regions. Each image was also labeled with all the diseases that are presented in a multi-label scheme where an image can have multiple diseases.

The CNN 120 has an extended topology which includes:
an image branch 121 based on a classification convolutional neural network for classifying the input images according to plant disease specific features,
a crop identification branch 122 for adding plant species information, and
a branch integrator 123 for integrating the plant species information with each respective input image. Thereby, the plant species information 20 specifies the crop on the respective input image 10. As described earlier, the crop ID is received via the interface 110 together with the respective input image.

CNN 120 is part of a classifier module 130 which applies 1200 the trained CNN 120 to the received test input. The CNN 120 delivers an output vector. In accordance with this output vector the classifier 130 provides 1300 a classification result CR1 indicating the one or more plant diseases associated with the one or more particular plant disease symptoms visible on the test input image. The classification result CR1 can be interpreted as a disease prediction with regards to the diseases associated with said symptoms.

Using the above described multi-crop training approach is advantageous compared the use of independent single crop models. The image branch 121 of the CNN topology described includes a backbone topology implemented by a classification convolutional neural network topology configured to gradually reduce the dimensionality of the image representation in the spatial domain while growing on the feature domain to learn image representations as sets of high level features. The network layers gradually learn filters that represent the different spatial parts of the image while simultaneously only the maximum responses for these learned filters are kept at each spatial neighborhood by using the maximum pooling layers. A person skilled in neural network technologies may use different architectures for such a backbone, including but not limited to: a RESNET* architecture, such as for example a RESNET50 topology, a DenseNet architecture, a VGGNet architecture, or any other suitable classification convolutional neural network. Such backbone topology does not include any crop information as input information. For example, the backbone may be derived from the ResNet50 topology presented by He et al. (2016. Deep residual learning for image recognition, in: Proceedings of the IEEE Conference on Computer Vision and Pattern Recognition, pp. 770-778.). The ResNet50 neural network is composed of 50 layers with initial two consecutive 3×3 convolutions, both followed by 3×3 max-pooling operations. This is followed by a set of consecutive residual blocks that gradually reduce the image spatial domain while growing on the feature domain that are able to learn the image representation as a set of 7×7×2048 high level features that are finally integrated by an average pooling operation to get an image representation layer with 2048 features. A more detailed description of this example of a backbone topology can be found in Picon et al. (2018) in section 4.3 "Network topology" and corresponding FIGS. 7 and 8.

The backbone is trained over the full dataset containing all crops and serving as an estimation of the network capability of creating appropriate visual representations without crop information. Results for the baseline network over the full training dataset are depicted in table 2 of FIG. 7B.

Additionally, the dataset was split into the different crops (wheat, barley, corn and rape seed) and trained separately. This experiment measures the network ability of learning each visual task separately and thus, with no need of crop input information. Results for the backbone topology over the full training dataset are depicted in table 3 of FIG. 7C.

Analysis of the results shows that the use of multi-crop models with a higher number of images provides better results than splitting the training dataset according to different crops. This is especially remarkable for the crops with a lower number of images and variability. It shows that, under such training conditions, the extracted visual features and models are enriched by the use of a dataset with a higher number of images and with higher variability superseding the performance of independent crop models.

Figure 3:
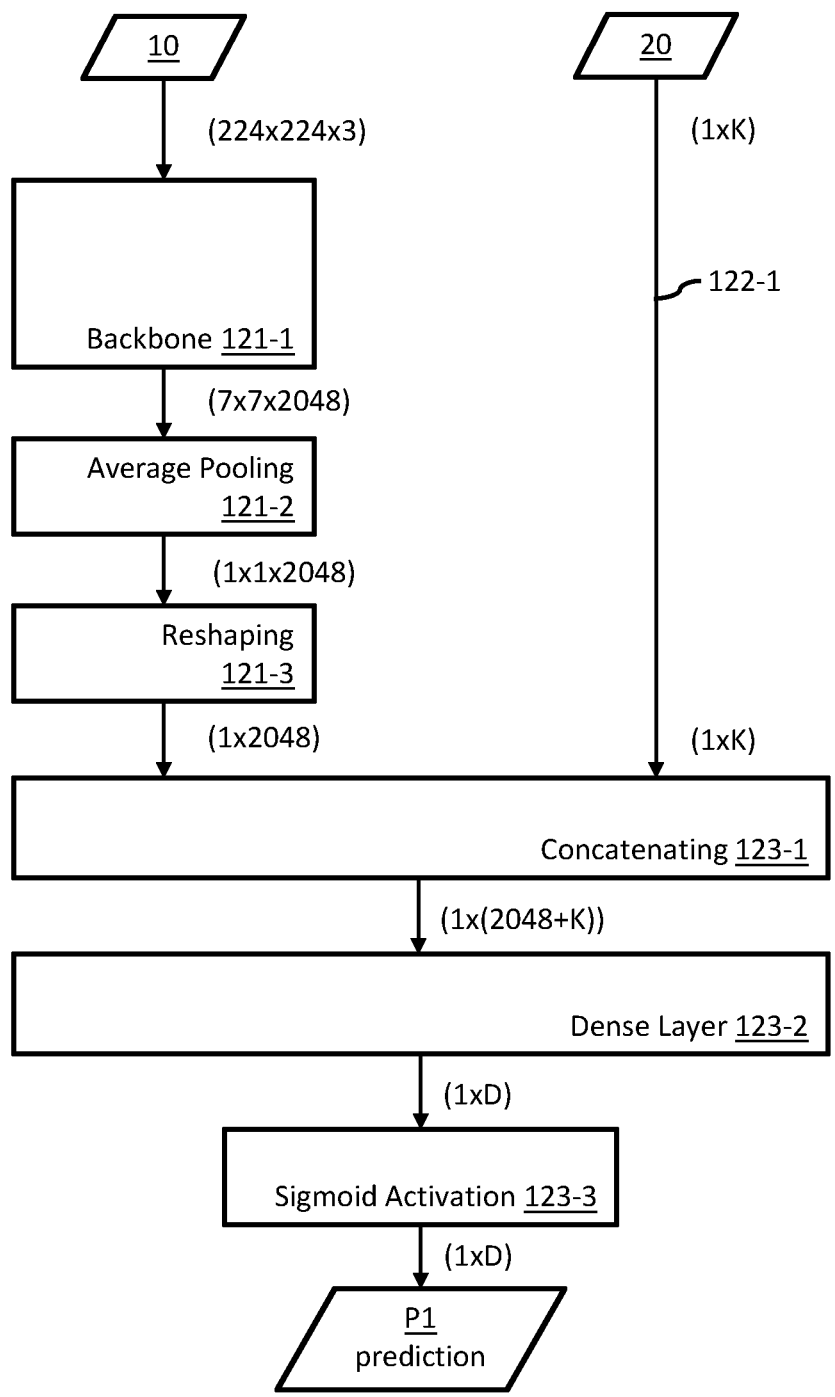
FIGS. 3 to 5 illustrate three alternative embodiments of a convolutional neural network topology which can be used by the computer system.
Figure 4:
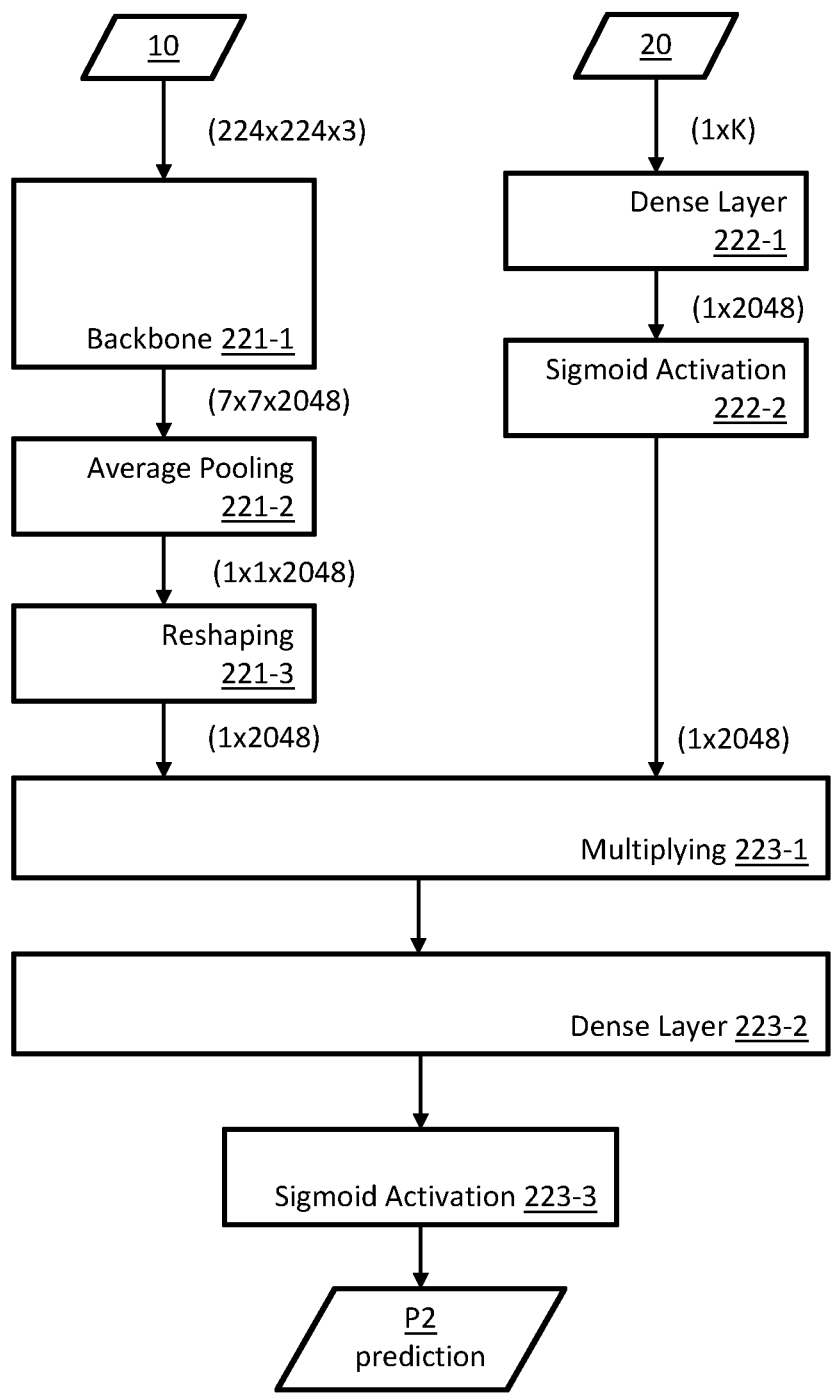
Figure 5:
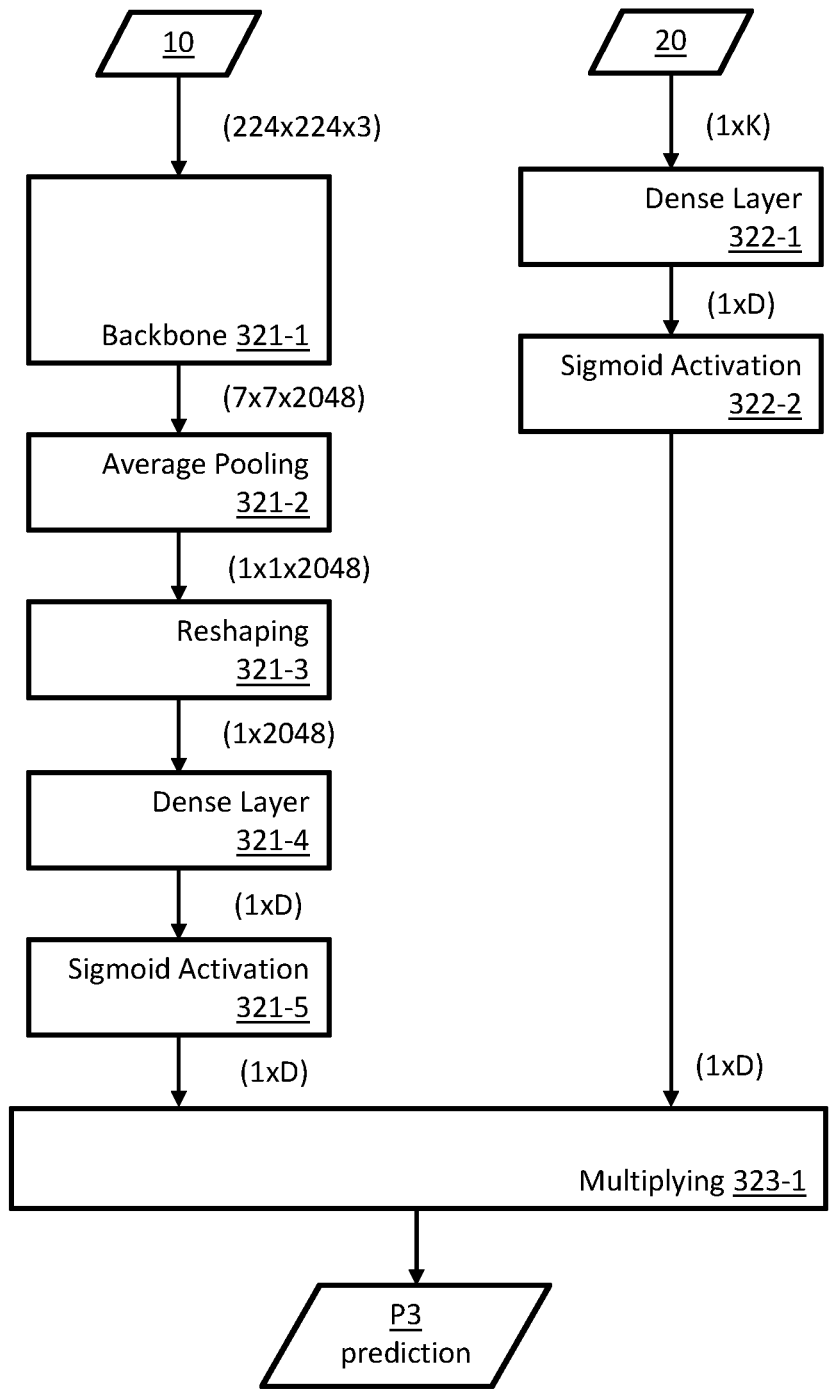

FIGS. 3 to 5 illustrate three alternative embodiments for the CNN 120 with different implementations for the image branch 121, the crop ID branch 122, and the branch integration 123.

FIG. 3 shows details of a first CNN 120 implementation also referred to as the bypass solution. The image branch includes said backbone topology 121-1 (classification convolutional neural network) which receives the test input image 10 (dimensions 224×224×3) and gradually reduces the dimensionality of the image representation in the spatial domain (to finally 7×7×2048) while growing on the feature domain to learn image representations as sets of high level features.

The backbone 121-1 is followed by an image representation layer with an average pooling operation 121-2 integrating the high level features, and with a reshaping operation 121-3 matching the dimensions of the average pooling output (1×1×2048) with the dimensions (1×K) of the crop identification branch 122-1. The crop ID 20 thereby is representing crop information as a categorical vector of K components where K is the number of crops in the model. This vector is of value 1 at the component corresponding to its crop class and of value 0 for the other components. The vector (1×K) is bypassing the entire image branch. In other words, the crop ID branch 122-1 is directly feeding into the branch integration starting with a concatenation layer 123-1 aggregating the crop identifier 20 received via the crop identification branch 122-1 into the output of the image representation layer by combining image descriptive features from the image representation layer with the information of the plant species present on the respective image. That is, this aggregation generates a new joint layer with the dimension (1×(2048+K)) that combines the image descriptive features from the image representation layer with the information of the plant species (crop) that is present on the input image.

A subsequent fully connected layer (dense layer 123-2) is responsible for mapping the relationships between the image high level features and the respective crops with the disease predictions P1 using a sigmoid activation function 123-3. The dense layer 123-2 reduces the dimension to (1×D).

During the end-to-end training process, the visual feature representation at the image representation layer and the subsequent crop-disease mapping are jointly learned. Intuitively, the learned visual features that are shared by all the crops dealing to a more rich dataset representation and the crop mapping allow mapping similar features into different diseases based on the plant species present.

FIG. 4 shows details of a second CNN 120 implementation. The image branch includes again a backbone topology 221-1 (classification convolutional neural network similar to the backbone 121-1) which receives the test input image 10 (dimensions 224×224×3) and gradually reduces the dimensionality of the image representation in the spatial domain (to finally 7×7×2048) while growing on the feature domain to learn image representations as sets of high level features.

Similar to the first implementation, an image representation layer follows the backbone topology with an average pooling operation 221-2 integrating the high level features, and with a reshaping operation 221-3 matching the dimensions of the average pooling output with the dimensions of the crop identification branch.

In the second implementation, the crop identification branch has a dense layer 222-1 directly connected to the crop identifier 20, with the number of neurons of the dense layer corresponding to the number of features at the image representation layer. A sigmoid activation function 222-2 is used to map the resulting output into the range of [0, 1].

The image representation layer and the dense layer are followed by a multiplication layer 223-1 to integrate the output of the sigmoid activation function 222-2 with the image representation layer by an elementwise multiplication. That is, in this implementation, the crop ID vector 20 is not concatenated as an additional feature as in the bypass implementation but is rather used to suppress the activation of certain visual features when they are irrelevant for the plant species that is present on the test input image. This ensures that the plant species (crop) that is present on the input image modulates the response of the learned visual descriptors reducing the effect of inconsistent ones. In other words, the learned visual descriptors which are irrelevant (because the associated visual symptoms cannot cause any disease on the particular crop as identified by the crop identifier) are suppressed.

The multiplication layer is the followed by a further dense layer 223-2 with a corresponding sigmoid activation function 223-3 to map relationships between image high level features and respective crops with disease predictions P2. Again, the visual feature representation at the image representation layer and the subsequent crop-disease mapping are jointly learned.

FIG. 5 shows details of a third CNN 120 implementation. The image branch includes again said backbone topology 321-1 (classification convolutional neural network) which receives the test input image 10 (dimensions 224×224×3) and gradually reduces the dimensionality of the image representation in the spatial domain (to finally 7×7×2048) while growing on the feature domain to learn image representations as sets of high level features.

Similar to the first and second implementations, an image representation layer follows the backbone topology, with an average pooling operation 321-1 integrating the high level features, and with a reshaping operation 321-3 matching the dimensions of the average pooling output with the dimensions of the crop identification branch.

Still within the image branch, the image representation layer is then followed by a first dense layer 321-4 to map image high level features to disease predictions using a first sigmoid activation function 321-5.

The crop identification branch is similar to the second implementation. A second dense layer 322-1 in the crop identification branch is directly connected to the crop identifier 20, with the number of neurons of the fully connected dense layer corresponding to the number of features at the image representation layer. A second sigmoid activation function 322-2 is used to map the resulting output into the range of [0, 1].

The third implementation again uses a multiplication layer 323-1 for branch integration. However, in this implementation, the multiplication layer follows the first and second dense layers 321-4, 322-1 with their corresponding sigmoid activation functions. This allows to suppress activations of diseases predicted by the first dense layer 321-4 but not present on the plant species represented by the crop identifier 20 by performing an elementwise multiplication of the activations. That is, predictions determined by the first dense layer 321 which are not consistent with the crop identifier information are suppressed by a multiplication with the "0" components of the vector 20 so that only the predictions P3 remain for such diseases which can actually occur on the crop represented by the crop identifier 20. In other words, the third implementation depicted in FIG. 5 resembles the multiplicative suppression of the activations in the second implementation of FIG. 4. However, in this case, the suppression is performed directly over the final predictions of the network (coming out of the first dense layer 321-4 and its sigmoid activation function 32-15) by suppressing the activation of diseases that cannot be present on the represented plant-species.

Again, the visual feature representation at the image representation layer and the subsequent crop-disease mapping are jointly learned.

FIGS. 6A, 6B and 6C illustrate examples of input images which are part of the training data set. The upper image parts 602, 612, 622 in the figures (above the dashed bold line) correspond to the actual input image whereas the lower parts 601, 611, 621 of images show a zoomed area which is indicated by a corresponding square (e.g., 603, 613, 623) in the actual impute images.

FIG. 6A illustrates examples of diseases on images contained in the dataset for wheat: a) *Puccinia recondita*, b) *Puccinia striiformis*, c) *Drechslera tritici-repentis*, d) *Septoria tritici*, and e) *Septoria nodorum*. Thereby, the images in FIG. 6A focus on leaves as the plant portions with disease symptoms.

FIG. 6B shows examples of diseases on images contained in the dataset for barley: a) *Pyrenophora teres*, b) *Ramularia collo-cygni*, c) *Rhynchosporium secalis*, d) *Puccinia hordei*, rape seed, e) *Phoma lingam*, corn: f) *Helminthosporium turcicum*. Thereby, the images in FIG. 6B focus on leaves as the plant portions with disease symptoms.

FIG. 6C shows further examples of diseases on images contained in the dataset for:
  barley: a) *Phoma lingam* (stem),
  wheat: b) *Gibberella zeae* (panicle), c) *Oculimacula yallundae* (stem), and
  rice: d) *Pyricularia oryzae*, e) Dirty panicle, f) *Thanatephorus cucumeris*.
Thereby, the images in FIG. 6C also include other plant portions with disease symptoms, such as the stem of the panicle.

A training database was created from the dataset defined in Table 1 of FIG. 7A. In order to avoid bias, the dataset was divided into 80% of the images for training, another 10% for validation and a final 10% for the testing set. In the "Crop" column the crop type is shown. The EPPO code (formerly known as a Bayer code) in the "EPPO-CODE" column, is an encoded identifier that is used by the European and Mediterranean Plant Protection Organization (EPPO), in a system designed to uniquely identify organisms—namely plants, pests and pathogens—that are important to agriculture and crop protection. EPPO codes are a component of a database of names, both scientific and vernacular. The EPPO codes in the EPPO-Code column relate to the respective crop. The EPPO codes in the "Disease EPPO-code" column relate to the diseases in the column "Disease Name". The column "Total" shows the number of input images for the respective characteristics in the data set.

Image acquisition date was set as division criterion to avoid images taken the same day to belong to different sets.

The Area under the Receiver Operating Characteristic (ROC) Curve (AuC) was selected as the most suitable algorithm performance metric, in order to account for the class imbalance present in the dataset (in such cases, the use of accuracy is discouraged). Computed values of sensitivity, specificity and balanced accuracy (BAC), Negative predictive value (NPV) and positive predictive value (PPV) for the different diseases are also provided for the threshold value that maximizes the validation set accuracy following the same methodology used at Johannes et al. (2017) and at Picon et al. (2018). During the training process, the same training pipeline and data augmentation scheme was followed as proposed at Picon et al. (2018) where the process is described in detail:

During a first stage, the backbone of the network architecture may be pre-trained over the Imagenet dataset Russakovsky et al. (2015. ImageNet Large Scale Visual Recognition Challenge. International Journal of Computer Vision (IJCV) 115, 211-252. doi:10.1007/s11263-015-0816-y.). This pre-trained network serves as a backbone network for testing the different network topologies.

During a second stage, each of the alternative CNN topologies (cf. FIG. 3 to 5) is loaded with the pre-trained weights for all shared layers and their weights are kept frozen. The last dense layer and the layers corresponding to the integration of the crop identification information are randomly initialized, and are the only ones allowed to modify its weights during learning at this stage.

A final training stage completes the fine-tuning by starting from the weights resulting from the previous stage and unfreezing all the layers, thus yielding a free, unconstrained training.

The network was trained using Stochastic Gradient Descent (SGD) optimization with an initial learning rate of $10^{-4}$, a learning rate decay of $10^{-6}$ and a momentum of 0.9. For the second training stage, the network was first trained during 100 epochs while keeping the rest frozen, and afterwards the full network was trained.

Table 2 in FIG. 7B illustrates validation results for the classification accuracy achievable by using only a backbone (baseline) topology (implemented with a ResNet50 architecture trained together with different crops.

Table 3 in FIG. 7C illustrates validation results for the classification accuracy achievable by using only a backbone (baseline) topology (implemented with a ResNet50 architecture trained separately for each crop (as applied in the prior art).

The first column in tables 2 and 3 show the EPPO codes of various plant diseases. The AuC column shows the Area Under ROC curve. Thereby, an ROC curve (receiver operating characteristic curve) is a graph showing the performance of a classification model at all classification thresholds. To compute the points in an ROC curve, an efficient, sorting-based algorithm AUC is used to provide this information. AUC measures the entire two-dimensional area underneath the entire ROC curve from (0, 0) to (1, 1). AUC provides an aggregate measure of performance across all possible classification thresholds. One way of interpreting AUC is as the probability that the model ranks a random positive example more highly than a random negative example.

The column BAC shows the Balanced accuracy: sensitivity+specificity/2: this is a global metric to measure the performance of the CNN algorithm. The BAC value is the value which allows to compare the performance of the various CNN topologies. The other four columns Sens, Spec, NPV and PPV are related to sensitivity, specificity, negative predictive value and positive predictive value (cf. https://www.ncbi.nlm.nih.gov/pmc/articles/PMC2636062/)

Table 4 in FIG. 7D shows the validation results achieved with the first implementation (RESNET-MC-1 architecture) of the CNN topology as described in cf. FIG. 3 (trained for all crops together). RESNET-MC-1 obtains an average BAC value of 0.96 while the baseline multi-crop model (average of BAC in table 2) only achieves a value of 0.94. The BAC value when using isolated models (cf. table 3) is only 0.85 for. In other words, the extended CNN topology as disclosed herein provides an alternative solution for detecting plant diseases which is able to achieve a better performance in accurately identifying plant diseases based on symptoms shown on respective crop images.

FIG. 8 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device 900 may correspond to the computer system 100 of FIG. 1. Computing device 950 is intended to represent various forms of mobile devices, such as personal digital assistants, cellular telephones, smart phones, and other similar computing devices. For example, computing device 950 may be used as a GUI frontend for a user to capture test input images and provide them to the computer device 900 with the respective crop identifier, and in turn, receive from the computer device, the disease prediction. Thereby computing device 950 may also include the output device 50 of FIG. 1. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method (1000) for detecting plant diseases using a convolutional neural network (120) trained with a multi-crop dataset, the training dataset comprising training input images showing various crops, and each of the training input images shows a part of a particular crop with one or more disease symptoms associated with one or more diseases of interest, or shows a part of a particular crop with abiotic marks, or shows a healthy part of a particular crop, the convolutional neural network (120) with an extended topology comprising an image branch (121) based on a classification convolutional neural network for classifying test input images according to plant disease specific features, a crop identification branch (122) for adding plant species information, and a branch integrator for integrating the plant species information with each test input image, the plant species information (20) specifying the crop on the respective test input image (10), the method comprising:

receiving (1100) a test input comprising an image of a particular crop showing one or more particular plant disease symptoms, and a respective crop identifier;

applying (1200) the trained convolutional neural network (120) to the received test input; and providing (1300) a classification result according to the output vector of the convolutional neural network, the classification result indicating the one or more plant diseases associated with the one or more particular plant disease symptoms.

2. The method of claim 1, wherein approximately equal shares in the number of input images used for the training of the convolutional neural network belong to initial stages of an infection, early stages of the infection, medium stages of the infection, and advanced stages of the infection.

3. The method of claim 1, wherein a new input image comprising a part showing a plant main portion with a main leaf or main stem or main panicle is cropped to a region surrounding the main portion, the main portion being segmented by a segmentation neural network with a pixel-wise categorical cross-entropy loss function being complemented with a total variation term.

4. The method of claim 1, wherein the convolutional neural network topology comprises:

a backbone topology implemented by a classification convolutional neural network topology configured to gradually reduce the dimensionality of the image representation in the spatial domain while growing on the feature domain being able to learn image representations as sets of high level features;

following the backbone topology, an image representation layer with an average pooling operation integrating the high level features, and with a reshaping operation matching the dimensions of the average pooling output with the dimensions of the crop identification branch;

following the image representation layer, a concatenation layer aggregating the crop identifier received via the crop identification branch into the output of the image representation layer by combining image descriptive features from the image representation layer with the information of the plant species present on the respective image;

following the concatenation layer, a dense layer to map relationships between image high level features and respective crops with disease predictions using a sigmoid activation function;

wherein the visual feature representation at the image representation layer and the subsequent crop-disease mapping are jointly learned.

5. The method of claim 1, wherein the convolutional neural network topology comprises:

a backbone topology implemented by a classification convolutional neural network topology configured to gradually reduce the dimensionality of the image representation in the spatial domain while growing on the feature domain being able to learn image representations as sets of high level features;

following the backbone topology, an image representation layer with an average pooling operation integrating the high level features, and with a reshaping operation matching the dimensions of the average pooling output with the dimensions of the crop identification branch;

the crop identification branch having a dense layer directly connected to the crop identifier input, with the number of neurons of the dense layer corresponding to the number of features at the image representation layer, and using a sigmoid activation function to map the resulting output into the range of [0, 1];

following the image representation layer and the dense layer, a multiplication layer to integrate the output of the sigmoid activation function with the image representation layer by an elementwise multiplication;

following the multiplication layer, a further dense layer to map relationships between image high level features and respective crops with disease predictions;

wherein the visual feature representation at the image representation layer and the subsequent crop-disease mapping are jointly learned.

6. The method of claim 1, wherein the convolutional neural network topology comprises:

a backbone topology implemented by a classification convolutional neural network topology configured to gradually reduce the dimensionality of the image representation in the spatial domain while growing on the feature domain being able to learn image representations as sets of high level features;

following the backbone topology, an image representation layer with an average pooling operation integrating the high level features, and with a reshaping operation matching the dimensions of the average pooling output with the dimensions of the crop identification branch;

following the image representation layer, a first dense layer to map image high level features to disease predictions using a first sigmoid activation function;

a second dense layer in the crop identification branch directly connected to the crop identifier, with the number of neurons of the fully connected dense layer corresponding to the number of features at the image representation layer, and using a second sigmoid activation function to map the resulting output into the range of [0, 1];

following the first and second dense layers, a multiplication layer to suppress activations of diseases predicted by the first dense layer but not present on the plant species represented by the crop identifier by performing an elementwise multiplication of the activations;

wherein the visual feature representation at the image representation layer and the subsequent crop-disease mapping are jointly learned.

7. The method of claim 4, wherein the crop identification branch is further configured to add further external data (21) together with the crop identifier (20), the further external data specifying particular environmental conditions associated with respective crop specific input image.

8. The method of claim 4, with the backbone topology being pre-trained for crop disease identification with a dataset suitable for posterior fine-tuning.

9. A non-transitory computer-readable medium comprising instructions encoded thereon that, when loaded into a memory of a computing device and executed by at least one processor of the computing device, execute the method steps of the computer implemented method according to claim 1.

10. A computer system (100) for detecting plant diseases the system comprising:
a data storage component storing a convolutional neural network (120) trained with a multi-crop dataset, the training dataset comprising training input images showing various crops, and each of the training input images shows a part (11) of a particular crop with one or more disease symptoms associated with one or more diseases of interest, or shows a part of a particular crop with abiotic marks, or shows a healthy part of a particular crop, the convolutional neural network (120) with an extended topology comprising an image branch (121) based on a classification convolutional neural network for classifying test input images according to plant disease specific features, a crop identification branch (122) for adding plant species information, and a branch integrator for integrating the plant species information with each test input image, the plant species information (20) specifying the crop on the respective test input image (10);
an interface (110) configured to receive a test input comprising an image (10) of a particular crop (1) showing one or more particular plant disease symptoms, and to receive a respective crop identifier (20) associated with the test input; and
a classifier module (130) configured to apply the trained convolutional neural network (120) to the received test input, and to provide a classification result (CR1) according to the output vector of the convolutional neural network (120), the classification result (CR1) indicating the one or more plant diseases associated with the one or more particular plant disease symptoms.

11. The system of claim 10, further comprising an image cropping module configured to crop a new input image including a main leaf of the crop to a region surrounding the main leaf, the main leaf being segmented by a segmentation neural network with a pixel-wise categorical cross-entropy loss function being complemented with a total variation term.

12. The system of claim 10 or 11, wherein the convolutional neural network topology comprises:
a backbone topology (121-1) implemented by a classification convolutional neural network topology configured to gradually reduce the dimensionality of the image representation in the spatial domain while growing on the feature domain to learn image representations as sets of high level features;
following the backbone topology (121-1), an image representation layer with an average pooling operation (121-2) integrating the high level features, and with a reshaping operation (121-3) matching the dimensions of the average pooling output with the dimensions of the crop identification branch (122-1);
following the image representation layer, a concatenation layer (123-1) aggregating the crop identifier (20) received via the crop identification branch (122-1) into the output of the image representation layer by combining image descriptive features from the image representation layer with the information of the plant species present on the respective image;
following the concatenation layer, a dense layer (123-2) to map relationships between image high level features and respective crops with disease predictions using a sigmoid activation function (123-3);
wherein the visual feature representation at the image representation layer and the subsequent crop-disease mapping are jointly learned.

13. The system of claim 10 or 11, wherein the convolutional neural network topology comprises:
a backbone topology (221-1) implemented by a classification convolutional neural network topology configured to gradually reduce the dimensionality of the image representation in the spatial domain while growing on the feature domain to learn image representations as sets of high level features;
following the backbone topology, an image representation layer with an average pooling operation (221-2) integrating the high level features, and with a reshaping operation (221-3) matching the dimensions of the average pooling output with the dimensions of the crop identification branch;
the crop identification branch having a dense layer (222-1) directly connected to the crop identifier (20), with the number of neurons of the dense layer corresponding to the number of features at the image representation layer, and using a sigmoid activation function (222-2) to map the resulting output into the range of [0, 1];
following the image representation layer and the dense layer, a multiplication layer (223-1) to integrate the output of the sigmoid activation function (222-2) with the image representation layer by an elementwise multiplication;
following the multiplication layer, a further dense layer (223-2) to map relationships between image high level features and respective crops with disease predictions;
wherein the visual feature representation at the image representation layer and the subsequent crop-disease mapping are jointly learned.

14. The system of claim 10 or 11, wherein the convolutional neural network topology comprises:
a backbone topology (321-1) implemented by a classification convolutional neural network topology configured to gradually reduce the dimensionality of the image representation in the spatial domain while growing on the feature domain to learn image representations as sets of high level features;
following the backbone topology, an image representation layer with an average pooling operation (321-1) integrating the high level features, and with a reshaping operation (321-3) matching the dimensions of the average pooling output with the dimensions of the crop identification branch;
following the image representation layer, a first dense layer (321-4) to map image high level features to disease predictions using a first sigmoid activation function (321-5);
a second dense layer (322-1) in the crop identification branch directly connected to the crop identifier (20), with the number of neurons of the fully connected dense layer corresponding to the number of features at the image representation layer, and using a second sigmoid activation function (322-2) to map the resulting output into the range of [0, 1];

following the first and second dense layers (321-4, 322-1) with their sigmoid activation functions, a multiplication layer (323-1) to suppress activations of diseases predicted by the first dense layer (321-4) but not present on the plant species represented by the crop identifier (20) by performing an elementwise multiplication of the activations;

wherein the visual feature representation at the image representation layer and the subsequent crop-disease mapping are jointly learned.

15. The system of claim 10, wherein the backbone topology is based on a RESNET topology.

\* \* \* \* \*